US012613315B2

(12) United States Patent
Kunze

(10) Patent No.: US 12,613,315 B2
(45) Date of Patent: Apr. 28, 2026

(54) VEHICLE LIDAR SENSOR MODULE

(71) Applicant: Magna Electronics Inc., Auburn Hills, MI (US)

(72) Inventor: Norbert Kunze, Diez (DE)

(73) Assignee: Magna Electronics Inc., Auburn Hills, MI (US)

( * ) Notice: Subject to any disclaimer, the term of this patent is extended or adjusted under 35 U.S.C. 154(b) by 850 days.

(21) Appl. No.: 18/051,104

(22) Filed: Oct. 31, 2022

(65) Prior Publication Data

US 2023/0083559 A1 Mar. 16, 2023

Related U.S. Application Data

(63) Continuation of application No. 16/190,201, filed on Nov. 14, 2018, now Pat. No. 11,486,968.

(60) Provisional application No. 62/586,335, filed on Nov. 15, 2017.

(51) Int. Cl.
*G01S 7/48* (2006.01)
*G01S 7/481* (2006.01)
*G01S 17/931* (2020.01)

(52) U.S. Cl.
CPC .......... *G01S 7/4813* (2013.01); *G01S 17/931* (2020.01); *G01S 7/4817* (2013.01)

(58) Field of Classification Search
CPC ..... G01S 7/4813; G01S 17/931; G01S 7/4817
See application file for complete search history.

(56) References Cited

U.S. PATENT DOCUMENTS

| | | | |
|---|---|---|---|
| 5,815,251 A | 9/1998 | Ehberts et al. | |
| 5,949,331 A | 9/1999 | Schofield et al. | |
| 6,587,186 B2 | 7/2003 | Bamji et al. | |
| 6,674,895 B2 | 1/2004 | Rafii et al. | |
| 6,678,039 B2 | 1/2004 | Charbon | |

(Continued)

FOREIGN PATENT DOCUMENTS

| | | |
|---|---|---|
| CN | 102205823 | 10/2011 |
| DE | 10244641 | 4/2004 |

(Continued)

OTHER PUBLICATIONS

Wikipedia, Lidar, Apr. 13, 2017.
(Continued)

*Primary Examiner* — Tony Ko
(74) *Attorney, Agent, or Firm* — HONIGMAN LLP

(57) ABSTRACT

A vehicular lidar sensor module includes a laser unit, a sensor unit, and a cover unit. The laser unit includes a housing, a laser printed circuit board, laser collimators and a first tension spring that urges the laser collimators against respective reference surfaces of the housing. Laser emitters are located at an end of respective laser collimators, which collimate light emitted by the respective laser emitters. The sensor unit includes a holder, receiver tubes, and a second tension spring that urges the receiver tubes against respective reference surfaces of the holder. The sensor unit includes sensors disposed at an end of the receiver tubes and attached at the holder via respective flexible attaching elements. With the flexible attaching elements attached at the holder, the sensors are aligned relative to the respective laser collimators via the respective flexible attaching elements and are fixed in their aligned positions.

34 Claims, 25 Drawing Sheets

18

(56)     References Cited

U.S. PATENT DOCUMENTS

| | | | |
|---|---|---|---|
| 6,690,268 | B2 | 2/2004 | Schofield et al. |
| 6,690,354 | B2 | 2/2004 | Sze |
| 6,693,517 | B2 | 2/2004 | McCarthy et al. |
| 6,710,770 | B2 | 3/2004 | Tomasi et al. |
| 6,825,455 | B1 | 11/2004 | Schwarte |
| 6,876,775 | B2 | 4/2005 | Torunoglu |
| 6,906,793 | B2 | 6/2005 | Bamji et al. |
| 6,919,549 | B2 | 7/2005 | Bamji et al. |
| 7,053,357 | B2 | 5/2006 | Schwarte |
| 7,157,685 | B2 | 1/2007 | Bamji et al. |
| 7,176,438 | B2 | 2/2007 | Bamji et al. |
| 7,203,356 | B2 | 4/2007 | Gokturk et al. |
| 7,212,663 | B2 | 5/2007 | Tomasi |
| 7,283,213 | B2 | 10/2007 | O'Connor et al. |
| 7,310,431 | B2 | 12/2007 | Gokturk et al. |
| 7,321,111 | B2 | 1/2008 | Bamji et al. |
| 7,340,077 | B2 | 3/2008 | Gokturk et al. |
| 7,352,454 | B2 | 4/2008 | Bamji et al. |
| 7,375,803 | B1 | 5/2008 | Bamji |
| 7,379,100 | B2 | 5/2008 | Gokturk et al. |
| 7,379,163 | B2 | 5/2008 | Rafii et al. |
| 7,405,812 | B1 | 7/2008 | Bamji |
| 7,408,627 | B2 | 8/2008 | Bamji et al. |
| 7,580,795 | B2 | 8/2009 | McCarthy et al. |
| 8,013,780 | B2 | 9/2011 | Lynam |
| 8,027,029 | B2 | 9/2011 | Lu et al. |
| 8,698,894 | B2 | 4/2014 | Briggance |
| 9,036,026 | B2 | 5/2015 | Dellantoni et al. |
| 9,146,898 | B2 | 9/2015 | Ihlenburg et al. |
| 9,575,160 | B1 | 2/2017 | Davis et al. |
| 9,599,702 | B1 | 3/2017 | Bordes et al. |
| 9,689,967 | B1 | 6/2017 | Stark et al. |
| 9,753,121 | B1 | 9/2017 | Davis et al. |
| 10,252,703 | B2 | 4/2019 | Ina |
| 10,703,341 | B2 | 7/2020 | Kunze |
| 11,486,968 | B2 | 11/2022 | Kunze |
| 2003/0222156 | A1 | 12/2003 | Bissonnette |
| 2007/0181784 | A1 | 8/2007 | Twiney et al. |
| 2007/0236364 | A1 | 10/2007 | Hubbard et al. |
| 2009/0122141 | A1 | 5/2009 | Nakamura et al. |
| 2010/0001897 | A1 | 1/2010 | Lyman |
| 2010/0245066 | A1 | 9/2010 | Sarioglu et al. |
| 2012/0062743 | A1 | 3/2012 | Lynam et al. |
| 2012/0117745 | A1 | 5/2012 | Hattori et al. |
| 2012/0158353 | A1 | 6/2012 | Sosnovskiy |
| 2012/0218412 | A1 | 8/2012 | Dellantoni et al. |
| 2013/0215271 | A1 | 8/2013 | Lu |
| 2013/0222592 | A1 | 8/2013 | Gieseke |
| 2014/0158731 | A1 | 6/2014 | Squire |
| 2014/0218529 | A1 | 8/2014 | Mahmoud et al. |

| | | | | |
|---|---|---|---|---|
| 2014/0375476 | A1 | 12/2014 | Johnson et al. | |
| 2015/0078940 | A1 | 3/2015 | Kikuta | |
| 2015/0124096 | A1 | 5/2015 | Koravadi | |
| 2015/0158499 | A1 | 6/2015 | Koravadi | |
| 2015/0251599 | A1 | 9/2015 | Koravadi | |
| 2015/0352953 | A1 | 12/2015 | Koravadi | |
| 2016/0036917 | A1 | 2/2016 | Koravadi et al. | |
| 2016/0210853 | A1 | 7/2016 | Koravadi | |
| 2016/0272163 | A1 | 9/2016 | Dreiocker et al. | |
| 2017/0129489 | A1 | 5/2017 | Pawlicki et al. | |
| 2017/0222311 | A1 | 8/2017 | Hess et al. | |
| 2017/0254873 | A1 | 9/2017 | Koravadi | |
| 2017/0276788 | A1 | 9/2017 | Wodrich | |
| 2017/0315231 | A1 | 11/2017 | Wodrich | |
| 2017/0356994 | A1 | 12/2017 | Wodrich et al. | |
| 2018/0013935 | A1* | 1/2018 | Kunze | H04N 23/51 |
| 2018/0015875 | A1 | 1/2018 | May et al. | |
| 2018/0045812 | A1 | 2/2018 | Hess | |
| 2018/0059236 | A1 | 3/2018 | Wodrich et al. | |
| 2018/0065623 | A1 | 3/2018 | Wodrich et al. | |
| 2018/0067194 | A1 | 3/2018 | Wodrich et al. | |
| 2018/0105176 | A1 | 4/2018 | Pawlicki et al. | |
| 2018/0172878 | A1 | 6/2018 | Hsiao | |
| 2018/0222450 | A1 | 8/2018 | Kunze | |
| 2018/0231635 | A1 | 8/2018 | Woehlte | |
| 2018/0231657 | A1 | 8/2018 | Wohlte | |
| 2018/0299533 | A1 | 10/2018 | Pliefke et al. | |
| 2019/0061760 | A1 | 2/2019 | Pawlicki et al. | |
| 2019/0072666 | A1 | 3/2019 | Duque Biarge et al. | |
| 2019/0072667 | A1 | 3/2019 | Duque Biarge et al. | |
| 2019/0072668 | A1 | 3/2019 | Duque Biarge et al. | |
| 2019/0072669 | A1 | 3/2019 | Duque Biarge et al. | |
| 2019/0100171 | A1 | 4/2019 | Ina | |
| 2019/0146066 | A1* | 5/2019 | Kunze | G01S 7/4813 356/5.01 |
| 2019/0217775 | A1 | 7/2019 | May et al. | |
| 2019/0337466 | A1 | 11/2019 | Oba | |
| 2019/0339382 | A1 | 11/2019 | Hess et al. | |

FOREIGN PATENT DOCUMENTS

| | | |
|---|---|---|
| DE | 102017116595 | 1/2019 |
| WO | 2010004931 | 1/2010 |
| WO | 2011090484 A1 | 7/2011 |
| WO | 2018007995 A1 | 1/2018 |

OTHER PUBLICATIONS

Fei et al., "A Flexible 3D Laser Scanning System Using a Robotic Arm," Optical Measurement Systems for Industrial Inspection X, Jun. 26, 2017.

* cited by examiner

Place Mems on reference surface. Apply glue before

Place Beam Splitter on reference surface. Apply glue before

Place 4 Laser Tubes at their place. No alignment or glue necessary

26

Place Laser PCB on green screwing supports. Apply thermal paste at contact surface PCB/housing. Fix with 4 screws.

24

Assemble Power PCB in Diecast Housing. Apply thermal paste between housing and PCB

22

Spring laser tubes fixes 4 Laser tubes and Power PCB

22

16  spring

Place window with heating at Diecast Housing. Fixed and sealed by glue.

36  Spring Receiver Tubes

Receiver Tubes 30

Diecast Mirror Holder 28

ASIC PCB 38

Sensors 40

32 Mirror Bar

Folding Mirrors 34

28 surfaces are machined references for mirrors, tubes and later placement in Diecast Housing References for placement in Diecast Housing

36

30

40

Folding Mirrors and Mirror Bar

28

38

Place 4 Receiver Tubes

36

30

40

38

28

Spring Receiver Tubes

ASIC PCB 4 sensors with flexfoils

50 Rubber sealing

46 Connector PCB

44 Customized combi connector with sealing

42 Diecast cover

48 Locking bracket

20

Sealing at connector, may be extra component due to tool complexity

Connector PCB

Connector

Locking-Bracket sealing

Laser Unit

Place for one of 4 screws

Sensor Unit

ASIC

VEHICLE LIDAR SENSOR MODULE

CROSS REFERENCE TO RELATED APPLICATIONS

The present application is a continuation of U.S. patent application Ser. No. 16/190,201, filed Nov. 14, 2018, now U.S. Pat. No. 11,486,968, which claims the filing benefits of U.S. provisional application Ser. No. 62/586,335, filed Nov. 15, 2017, which is hereby incorporated herein by reference in its entirety.

FIELD OF THE INVENTION

The present invention relates generally to a vehicle sensing system for a vehicle and, more particularly, to a vehicle sensing system that utilizes one or more sensors at a vehicle to provide a field of sensing at or around the vehicle.

BACKGROUND OF THE INVENTION

Use of imaging sensors or ultrasonic sensors or radar sensors in vehicle sensing systems is common and known. Examples of such known systems are described in U.S. Pat. Nos. 8,013,780 and 5,949,331 and/or U.S. publication No. US-2010-0245066 and/or International Publication No. WO 2011/090484, which are hereby incorporated herein by reference in their entireties.

SUMMARY OF THE INVENTION

The present invention provides a driver assistance system or sensing system for a vehicle that utilizes a sensor module disposed at the vehicle to sense a respective region exterior of the vehicle, with the sensor module comprising at least one Lidar sensor disposed in a housing. The sensor module includes a housing that houses a laser unit and a sensor unit. A cover portion includes an electrical connector and attaches to the housing to house the laser unit and sensor unit.

The sensor module provides a two-part design with accurately machined referencing surfaces for each part (for the laser unit and for the receiver unit). The sensor module also provides an enhanced way of fixing the eight tubes (e.g., four laser tubes and four receiver tubes) with tension springs, which push the respective tubes against the respective reference surfaces. The sensor module uses a tension spring to additionally press a printed circuit board or PCB (Power PCB) against a side wall of the housing for thermocouple coupling. By holding and adjusting the sensors in individual nests of the mirror holder with slotted foils, the sensor module allows for adjustment in six degrees of freedom while reducing the mechanical stresses in the foil.

These and other objects, advantages, purposes and features of the present invention will become apparent upon review of the following specification in conjunction with the drawings.

DESCRIPTION OF THE PREFERRED EMBODIMENTS

Figure 1:
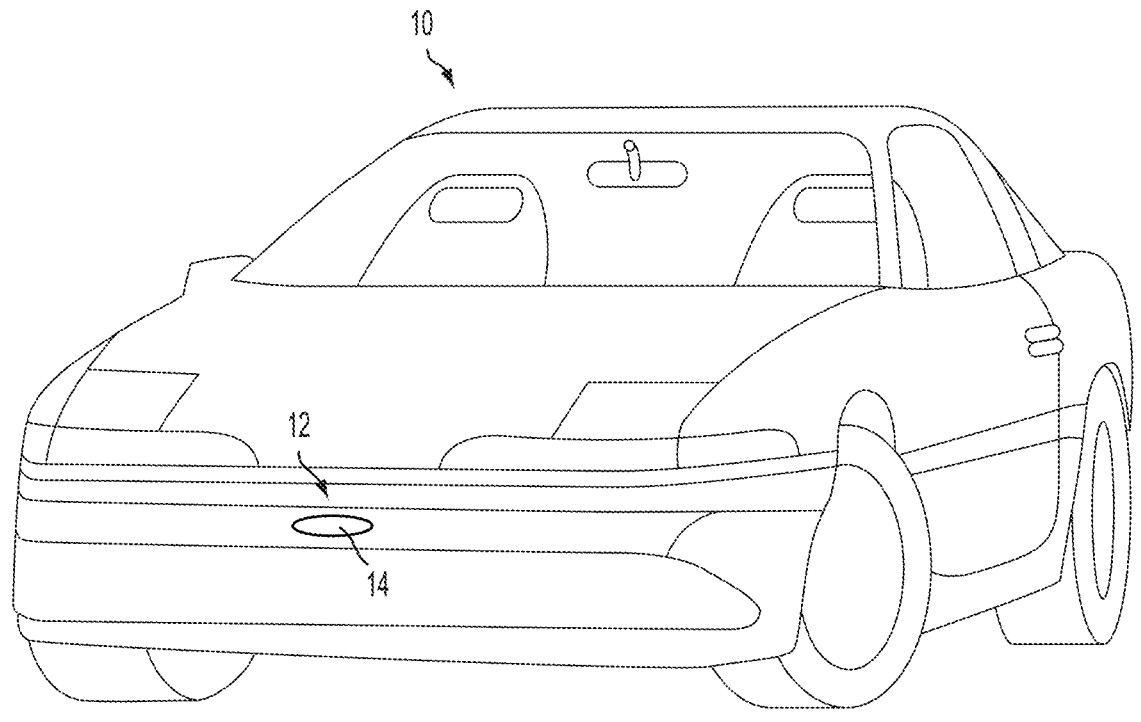
FIG. 1 is a perspective view of a vehicle with a sensing system that incorporates a sensor module in accordance with the present invention.

A vehicle sensing system, such as a driver assist system, object detection system, parking assist system and/or alert system, operates to capture sensing data exterior of the vehicle and may process the captured data to detect objects at or near the vehicle and in the predicted path of the vehicle, such as to assist a driver of the vehicle in maneuvering the vehicle in a forward or rearward direction or to assist the driver in parking the vehicle in a parking space (or to assist an autonomous vehicle control in controlling the vehicle autonomously or semi-autonomously). The system includes a processor that is operable to receive sensing data from multiple sensors and to provide an output to a control that, responsive to the output, generates an alert or controls an accessory or system of the vehicle, or highlights or overlays an alert on a display screen (that may be displaying video images captured by a single rearward viewing camera or multiple cameras providing forward, side or 360 degree surround views of the area surrounding the vehicle during a reversing or low speed maneuver of the vehicle), or controls one or more vehicle systems.

Referring now to the drawings and the illustrative embodiments depicted therein, a vehicle 10 includes an driver assistance system or sensing system 12 that includes at least one Lidar sensor unit, such as a forward facing Lidar sensor module or unit 14 (and the system may optionally include multiple exterior facing sensors, such as other Lidar sensors and/or other non-imaging sensors and/or cameras or imaging sensors, such as a rearward facing sensor at the rear of the vehicle, and a sideward/rearward facing sensor at respective sides of the vehicle), which sense regions exterior of the vehicle. The lidar module or system illuminates a target area with pulsed laser light and measures how long it takes for reflected signals to be returned to the receiver of the module. The lidar module or system includes a laser source or transmitter or laser tube or tubes or laser collimator, a sensitive photodetector or receiver or receiving tube or tubes, synchronization and data processing electronics. The sensing system 12 includes a control or electronic control unit (ECU) or processor that is operable to process data captured by the sensor or sensors and may detect objects or the like. The data transfer or signal communication from the sensor to the ECU may comprise any suitable data or communication link, such as a vehicle network bus or the like of the equipped vehicle. The Lidar sensor module and system may utilize aspects of the sensing modules and systems described in U.S. Publication No. US-2018-0222450, which is hereby incorporated herein by reference in its entirety.

The automotive Lidar sensor module of the present invention is configured to be mounted at an exterior portion of the vehicle for detecting the exterior environmental scene at or surrounding or partially surrounding the vehicle. Optionally, multiple Lidar sensor modules, possibly with identical housings, may come into use. A preferred location for these Lidar sensor modules to mount is within the bumper of the vehicle and viewing or sensing outwardly (such as forward, rearward and/or sideward of the vehicle). Generally, every design element at or in which a Lidar sensor can be hidden and has an effectual view opening is optionally a place for mounting a Lidar sensor, such as at the front grill, the head lights, the daytime running lights, a blinker, the license plate illumination, the tire housings, the vehicle emblem, the trunk lid opener handle, the door handles, the rearview mirrors or wing elements with rear view cameras at the place where usually the rearview mirrors were, the rooftop bars, the roof top antenna fins or the spoiler or the like.

Figure 2:
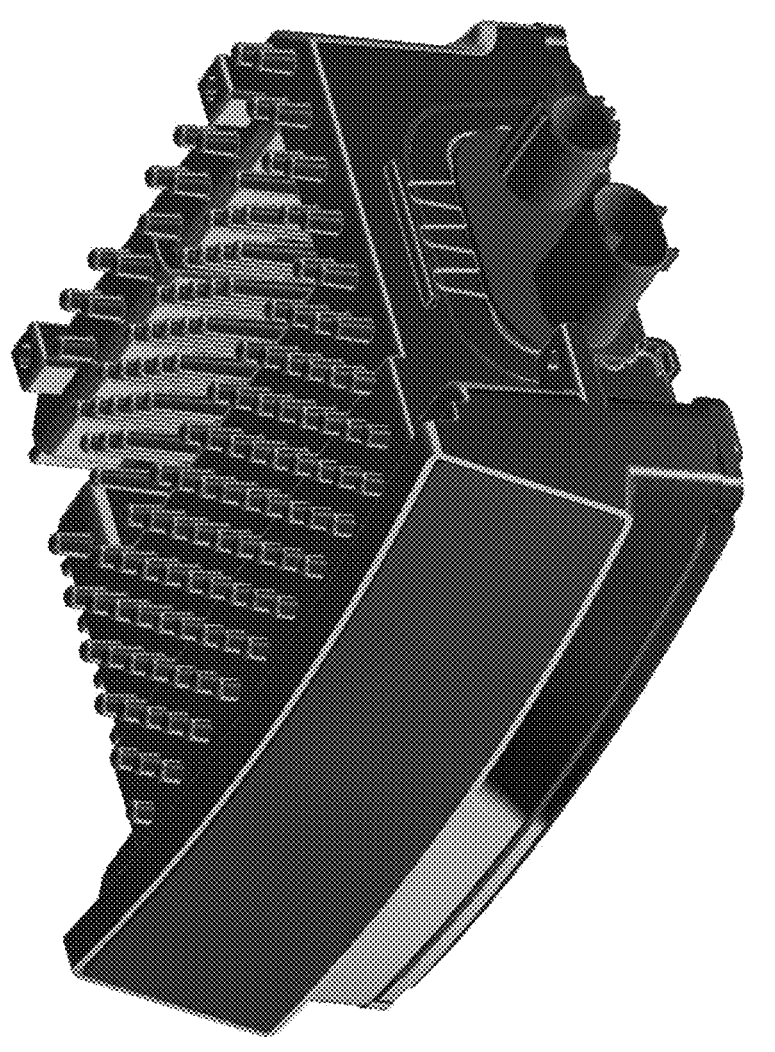
FIG. 2 is a perspective view of the sensor module of the present invention.
Figures 3, 4, 5, 6:
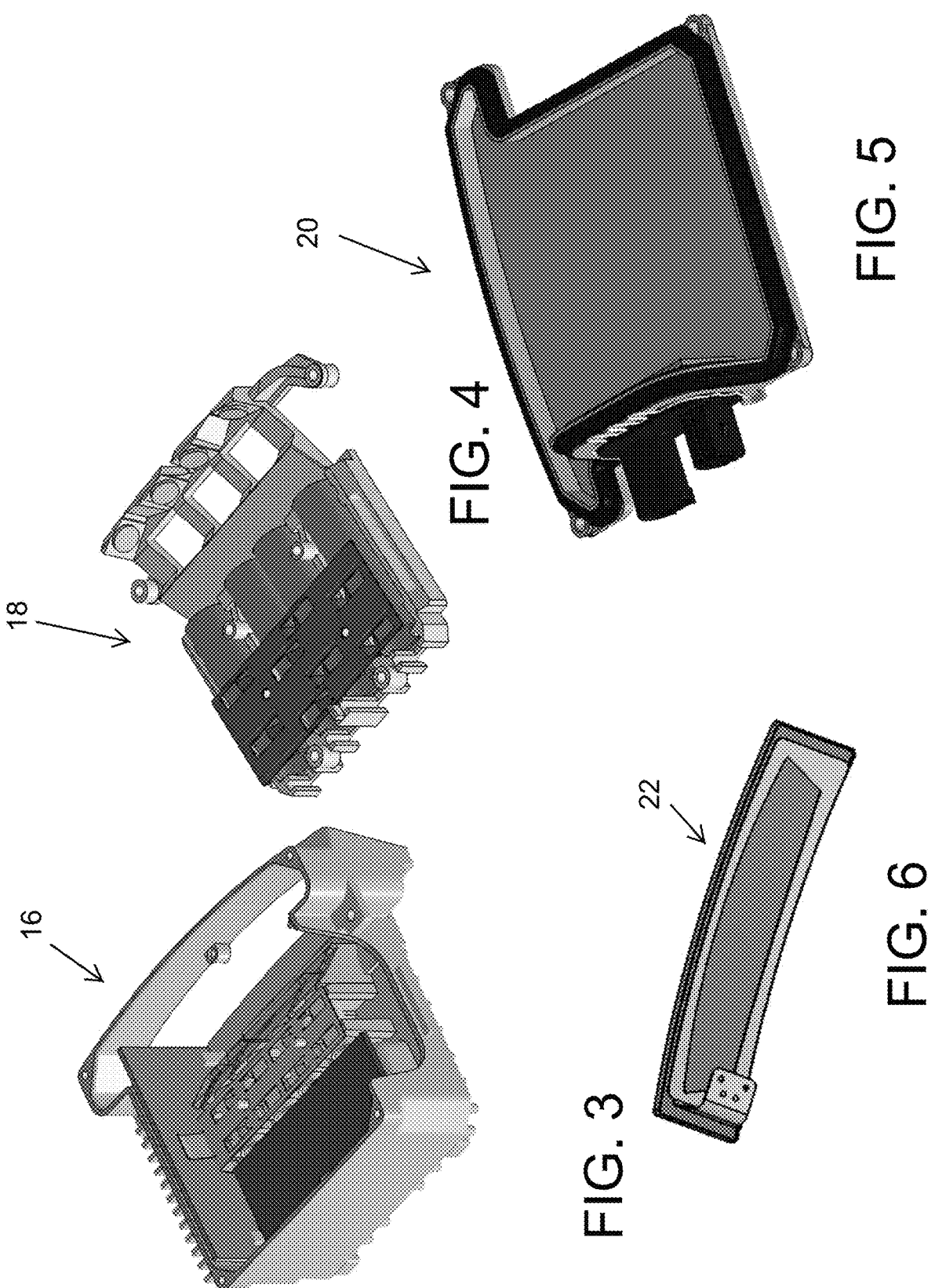
FIG. 3 is a perspective view of the laser unit of the sensor module.
FIG. 4 is a perspective view of the sensor unit of the sensor module.
FIG. 5 is a perspective view of the cover of the sensor module.
FIG. 6 is a perspective view of the window of the sensor module.
Figure 7:
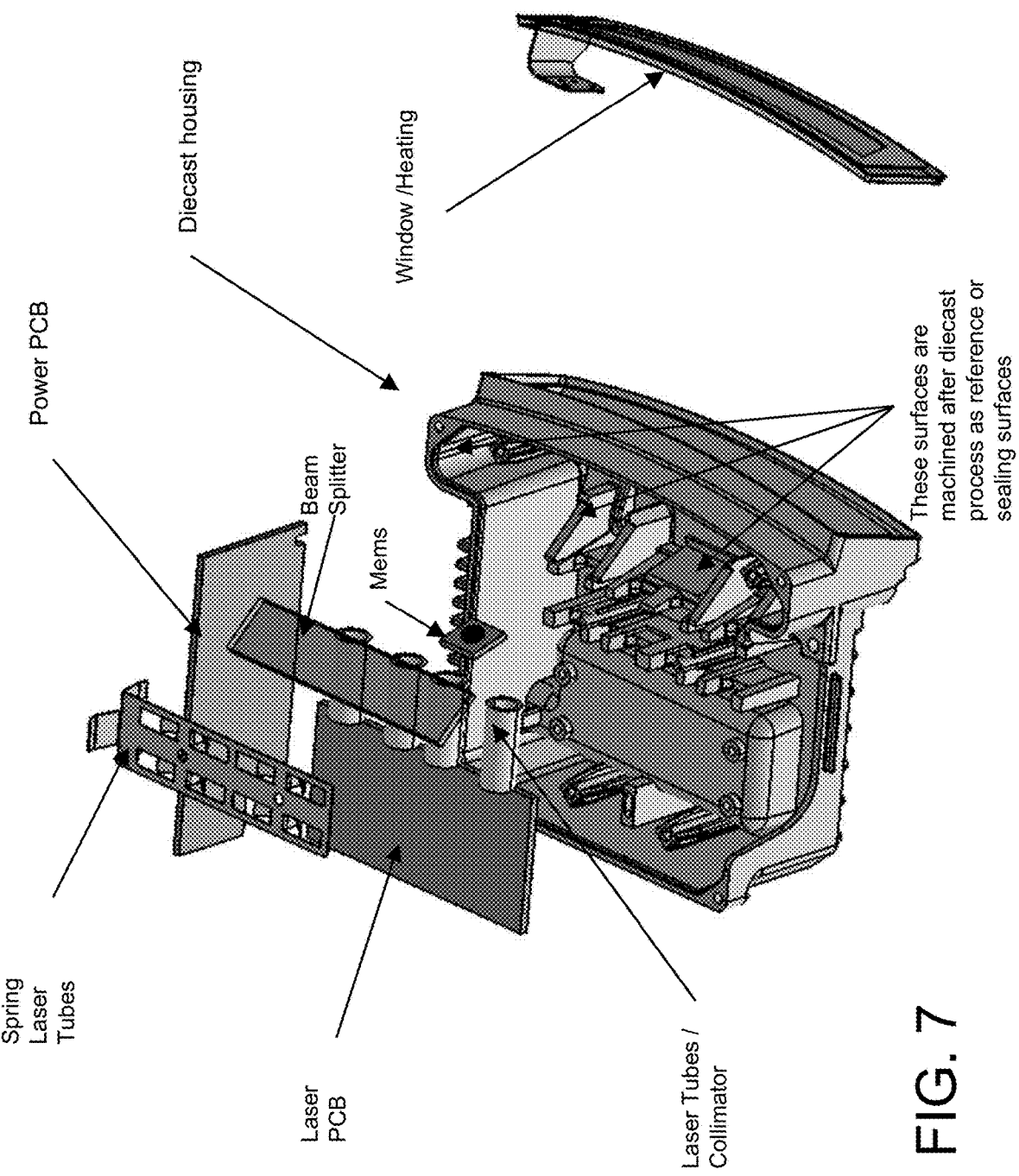
FIG. 7 is an exploded perspective view of the laser unit of the sensor module.
Figure 8:
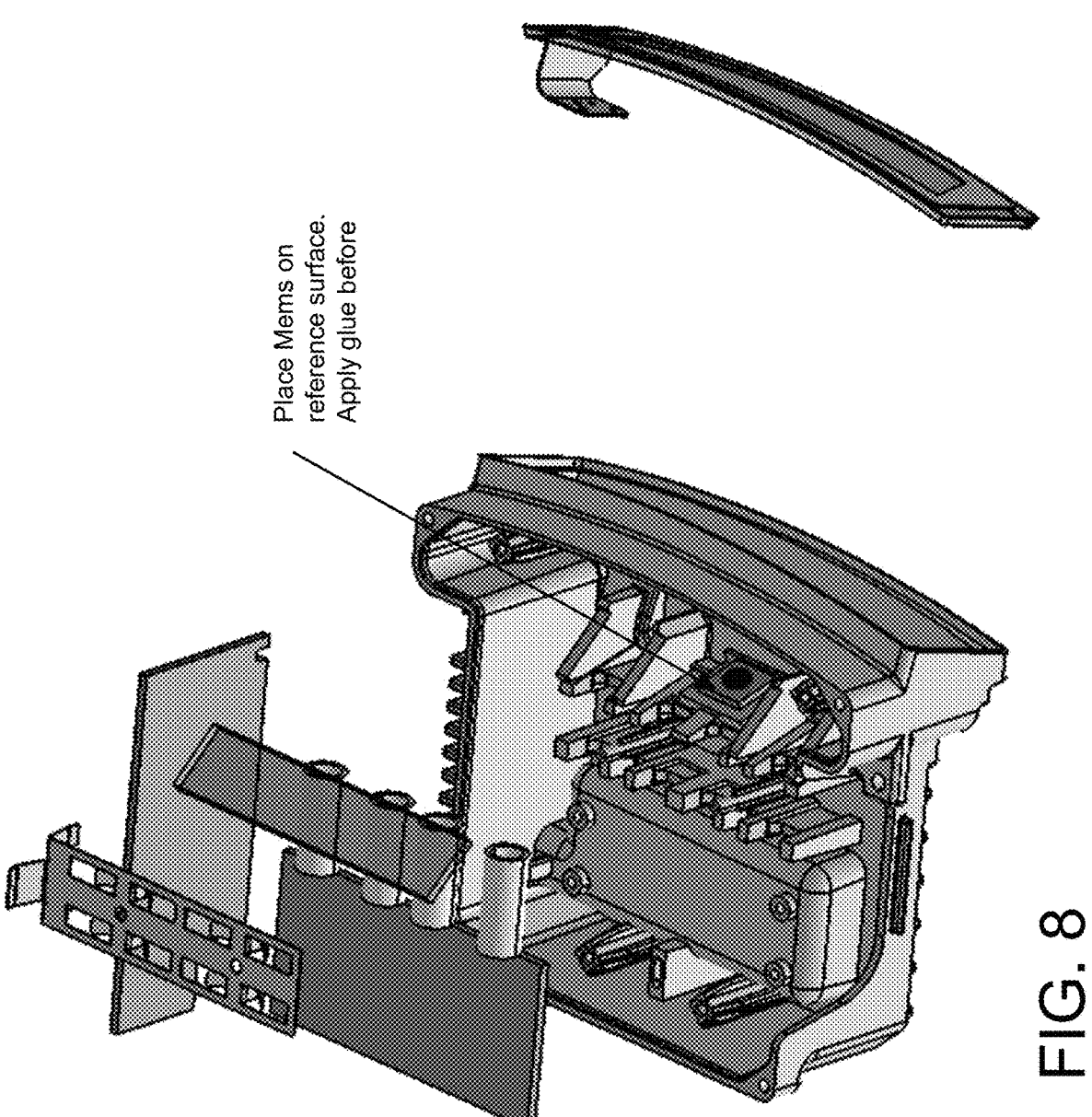
FIGS. 8-14 are perspective views showing the assembly process of the laser unit of the sensor module.
Figure 9:
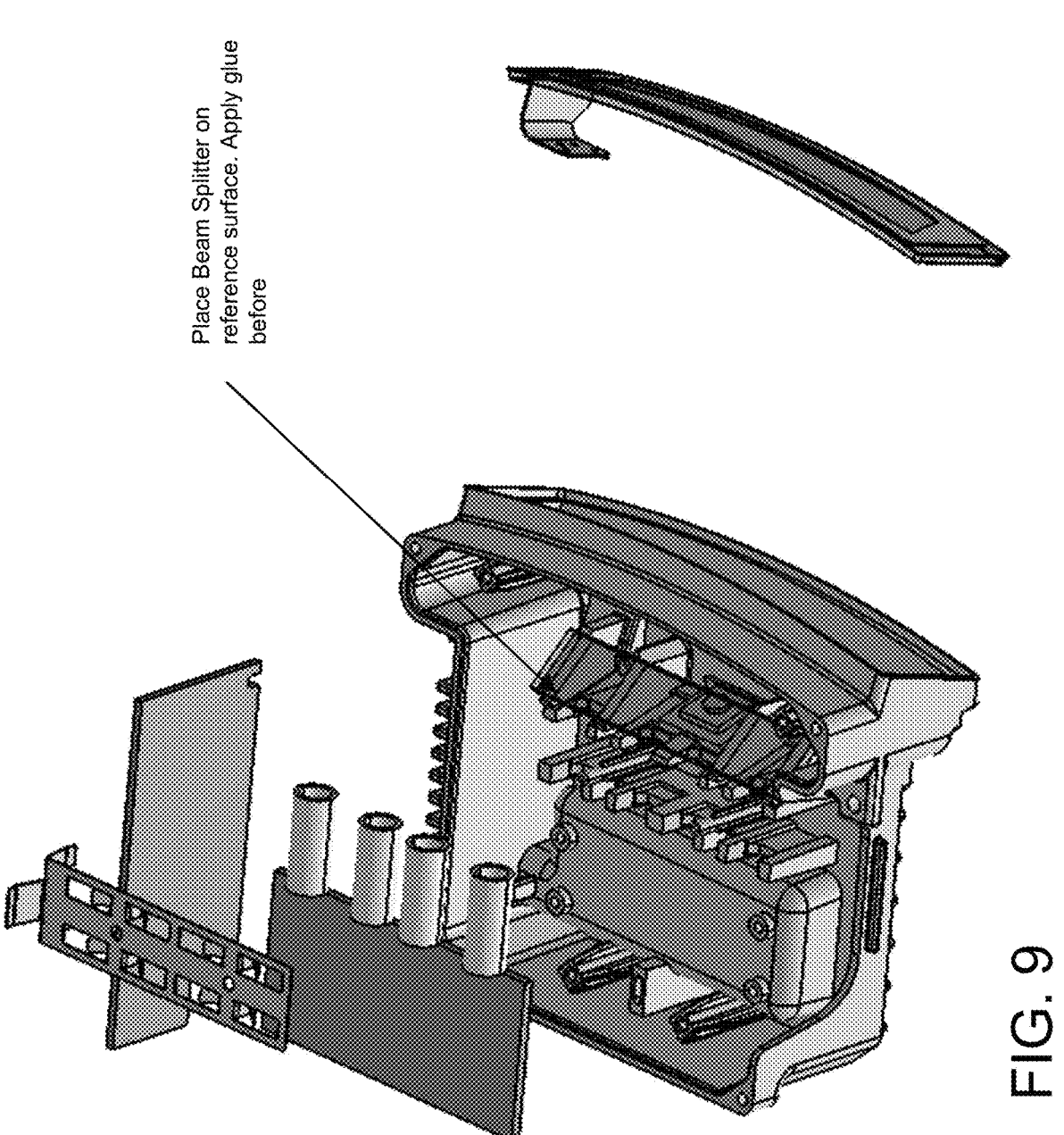
Figure 10:
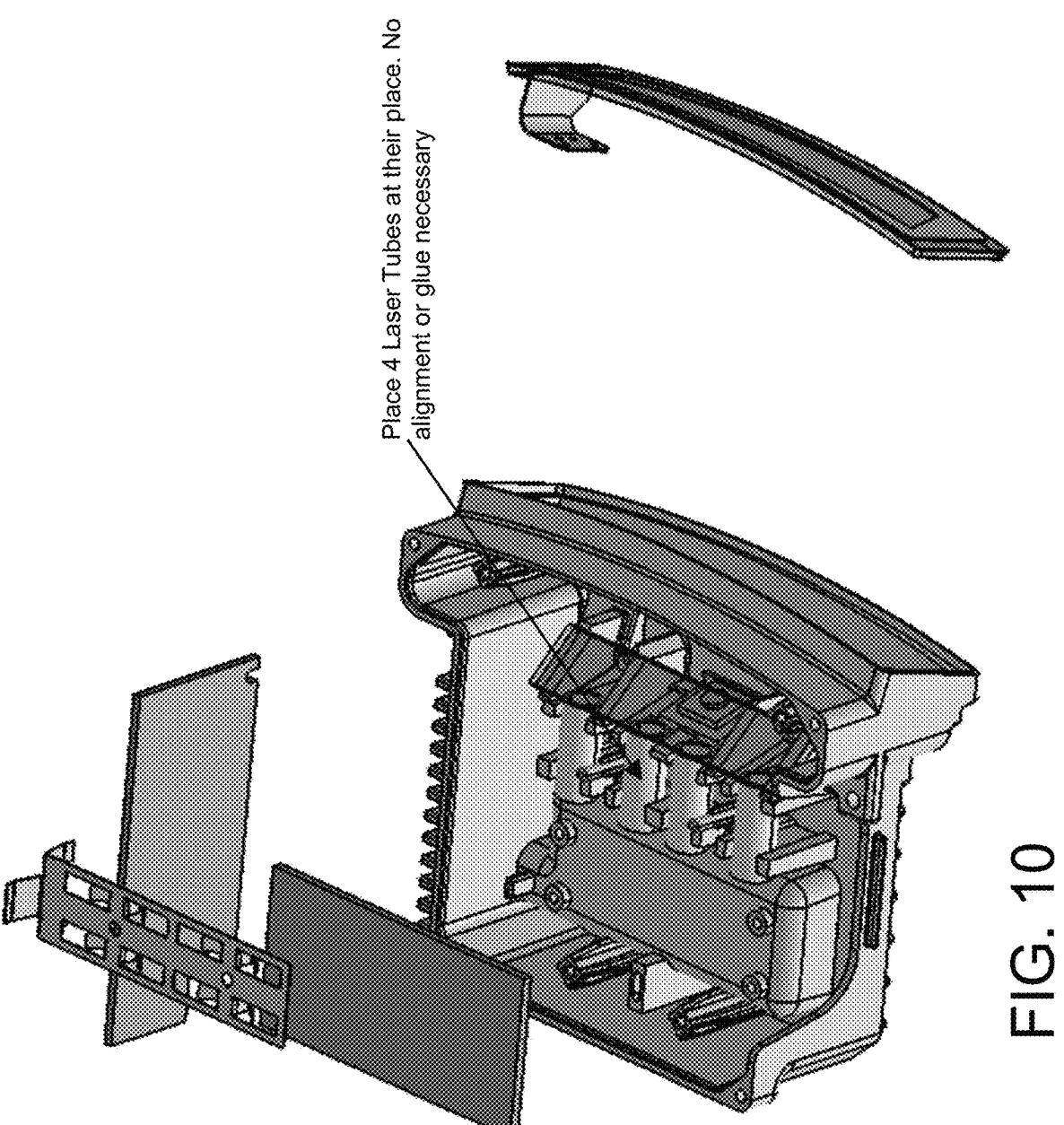
Figures 14, 14A:
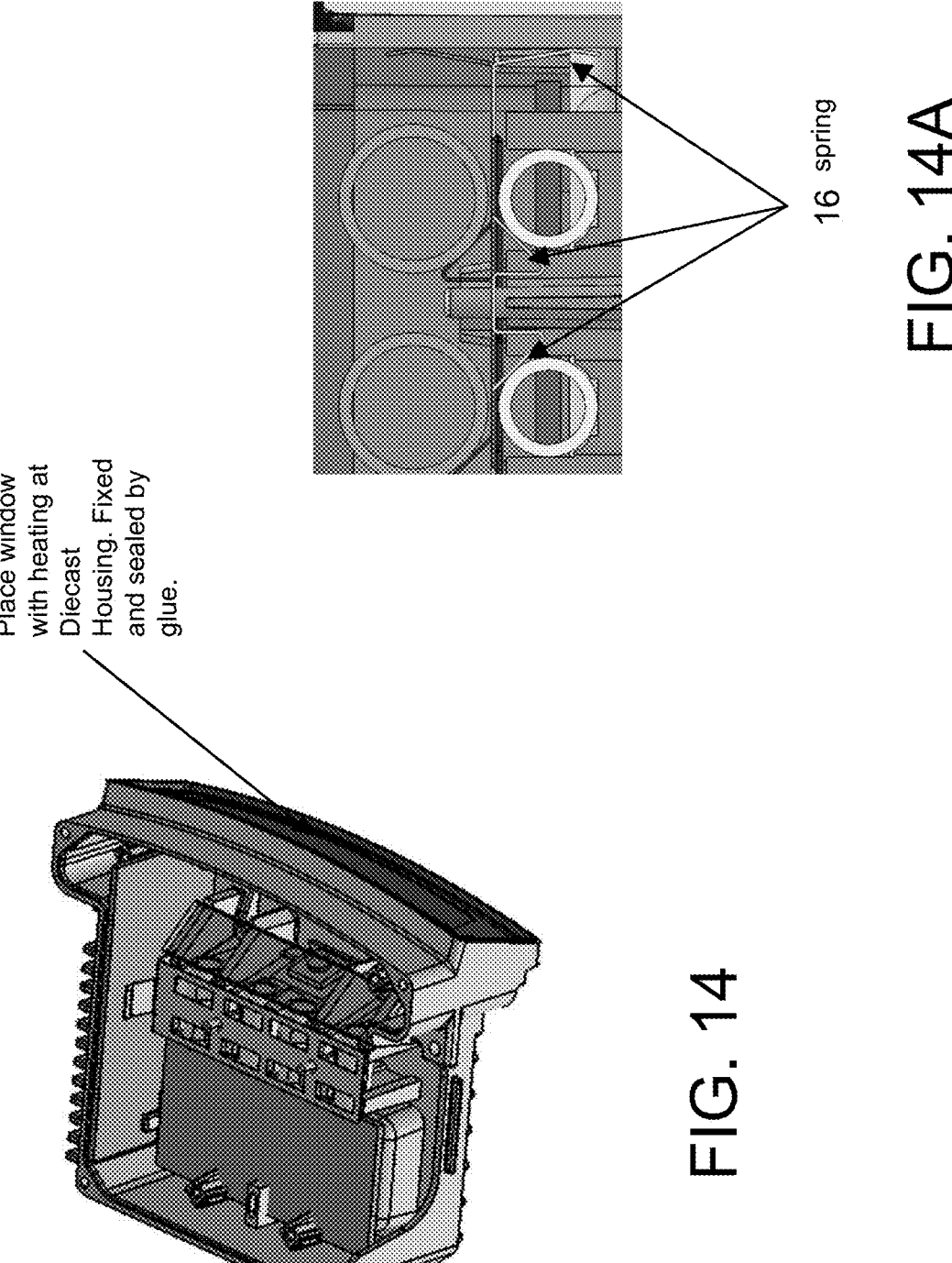
FIG. 14A is an end view of the laser unit and sensor unit, showing the biasing of the laser tubes via a spring element.
Figures 15, 16:
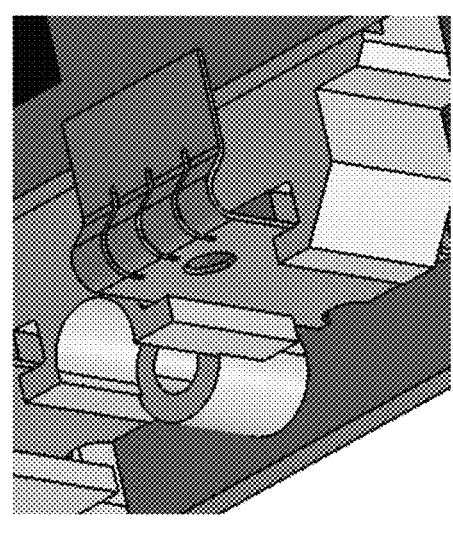
FIG. 15 is an exploded perspective view of the sensor unit of the sensor module.
FIG. 16 is an enlarged perspective view of the sensors at the diecast mirror holder of the sensor unit.

The sensor module 14 (FIG. 2) comprises a laser unit 16 (FIG. 3), a sensor unit 18 (FIG. 4), a cover unit 20 (FIG. 5) and a window/heating element 22 (FIG. 6). As shown in FIG. 7, the laser unit includes a diecast metallic housing, a microelectromechanical system (MEMS), a beam splitter, a plurality of laser tubes or collimators (that have the laser emitters of the laser PCB at one end and that collimate the light emitted by the emitters so that collimated laser light is emitted from the opposite end of the laser tubes), a laser PCB (having the plurality of laser light emitters disposed thereat), a power PCB, and a laser tube spring. As shown in FIGS. 8-13, these elements are disposed at the housing and affixed thereat to form the laser unit. The window/heating element is attached at an opening of the housing (FIG. 14).

In the illustrated embodiment, the diecast housing includes a plurality of machined surfaces to provide reference or sealing surfaces (where various components of the laser unit may be disposed or attached and where the sensor unit may be attached and where the cover unit may be attached, as discussed below). The MEMS is disposed at one of the reference surfaces (FIG. 8) and adhesively attached thereat. The beam splitter is placed on reference surfaces (FIG. 9) and adhesively attached thereat. The beam splitter and MEMS have to be placed on their reference surfaces in the diecast housing. No alignment is needed, they may be simply adhesively bonded or glued in place and are at the proper orientation due to the machined reference surfaces. They are to be fixed during the gluing process in a jig, and may be accessed from the open top of the housing and through the window opening.

The laser tubes are placed in receiving portions of the housing (FIG. 10), with no alignment or adhesive being necessary. Each laser tube is thus in contact with two machined surfaces in the diecast housing with little gap to the opposite side. The tubes will be pressed against the sidewall by the spring force of the laser tube spring 22 that is attached at the housing (FIGS. 12 and 13), and thus they are well-referenced.

Figure 11:
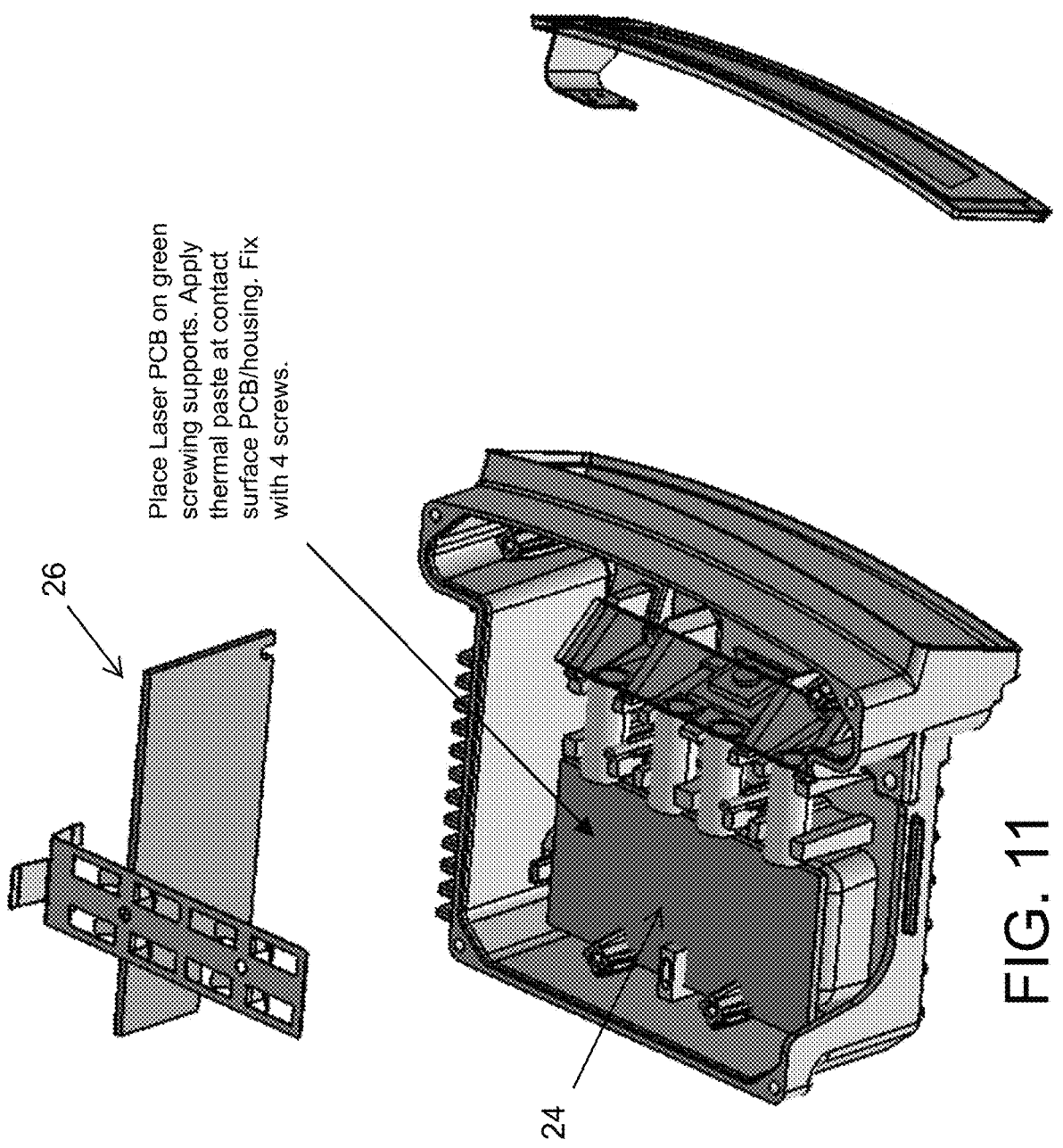
Figure 12:
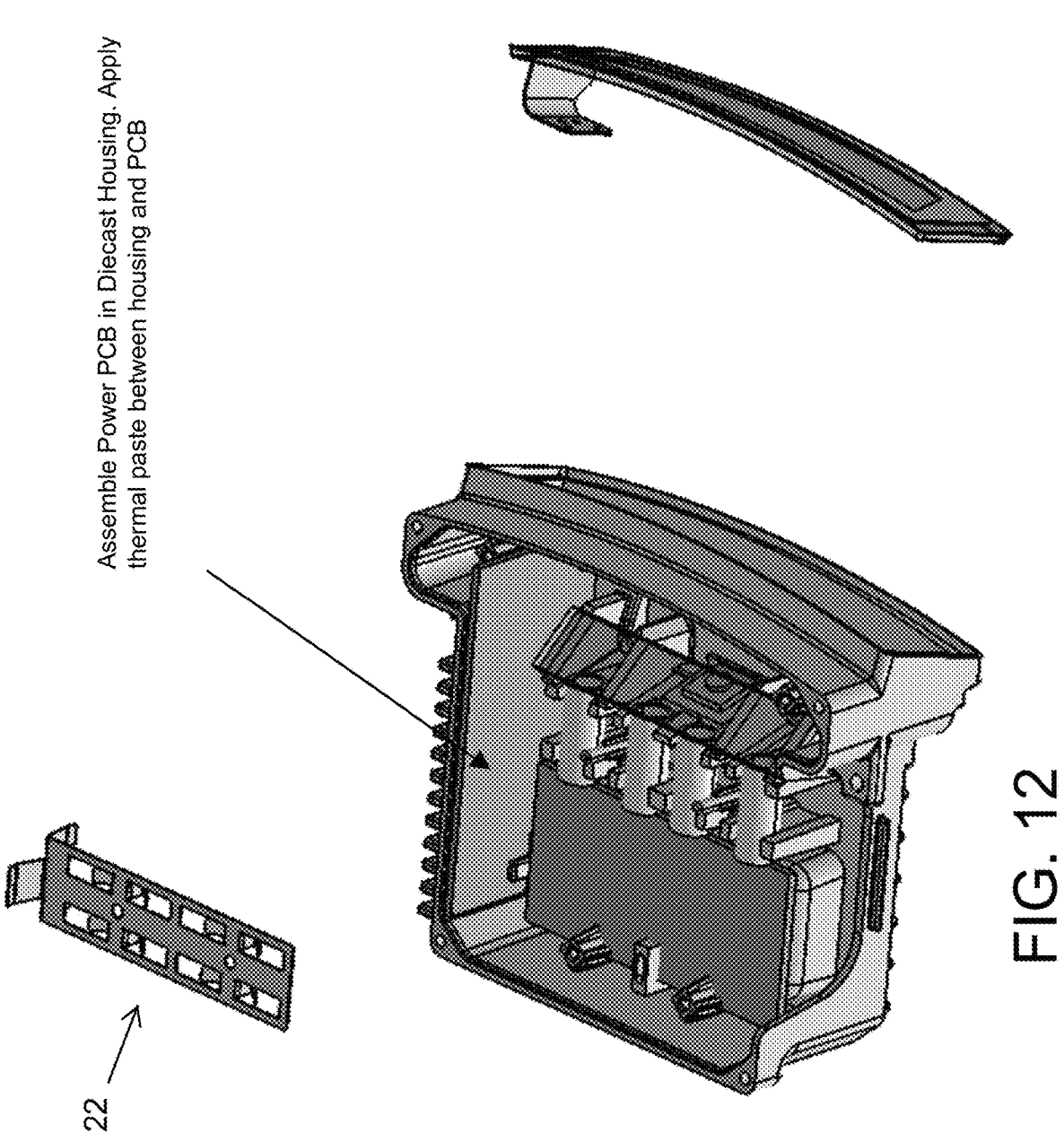
Figure 13:
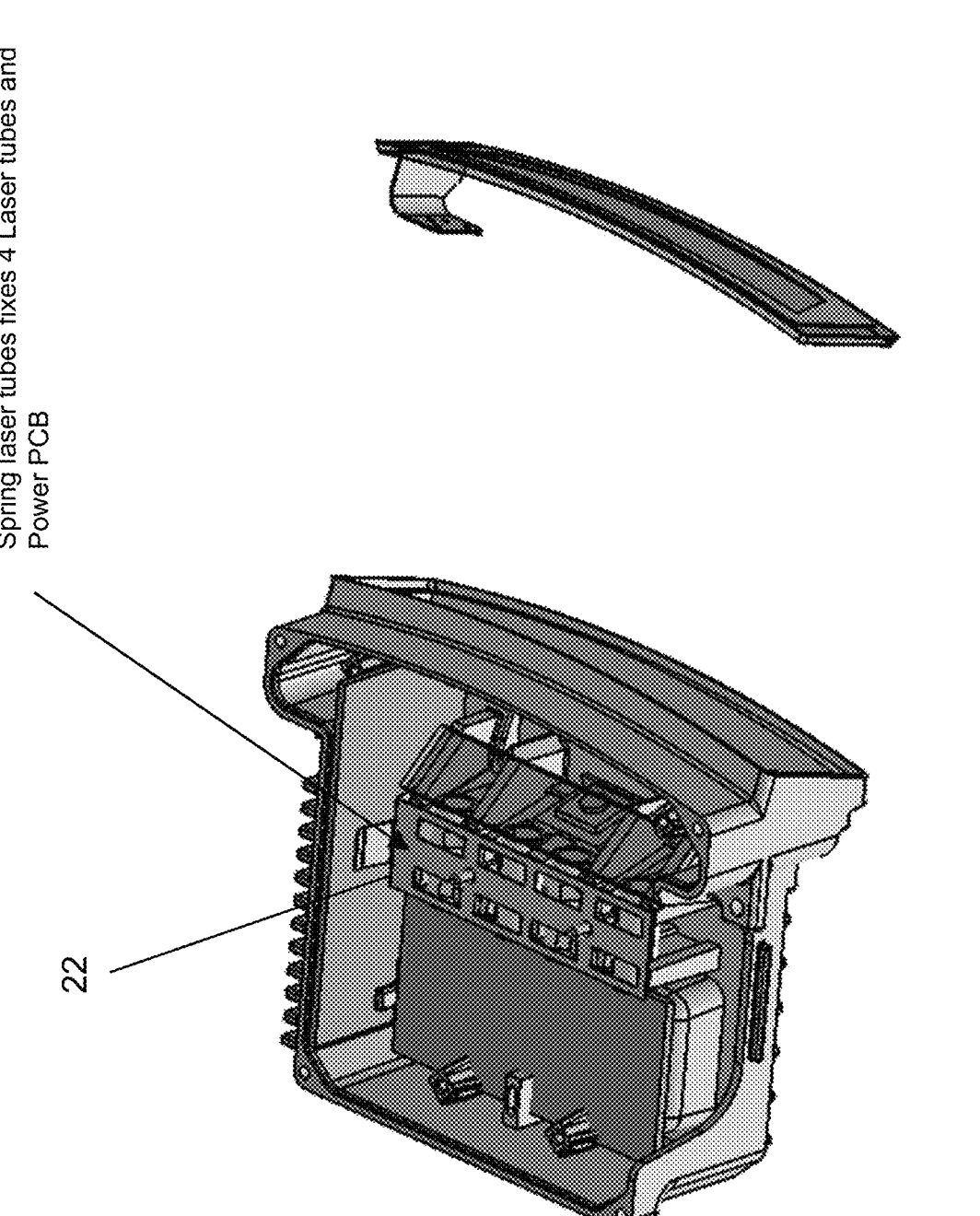

The laser PCB 24 is placed at supports of the housing (FIG. 11). A thermal paste may be applied at the contact surface of the PCB and/or housing, and the PCB may be affixed via fasteners, such as four screws. The power PCB is assembled in the diecast housing along a sidewall of the housing (FIG. 12). A thermal paste may be applied between the housing sidewall and the power PCB. The housing sidewall may include a plurality of fins or heat sink elements to enhance heat dissipation at the sidewall. The spring is disposed at the housing over the laser tubes (FIG. 13) and fixes the four laser tubes and the power PCB relative to the housing (FIG. 14A). The window (with heating, such as via a transparent electronic conductor disposed at and over the window or such as via embedded resistive wires at the window or the like) is placed at the housing and may be fixed thereat and sealed via an adhesive or sealant (FIG. 14). The electrical connections for the laser unit (such as between the PCBs and the electrical elements) may be done when the laser unit assembly is completed.

Referring now to FIGS. 15-22, the sensor unit comprises a diecast metallic mirror holder 28, receiver tubes 30 (that receive laser light that has been emitted by the laser tubes and reflected off objects in the field of sensing of the sensing module and that direct the received light toward the sensors), a mirror bar 32, folding mirrors 34, spring receiver tubes 36, an ASIC PCB 38 and sensors 40. The subcomponent with alignment of sensor diodes may be necessary (see FIG. 16). The sensors are connected via flex-foil with gaps to obtain better flexibility. Alignment with 4-fold 3-finger gripper achieves six degrees of freedom adjustability of the sensors (e.g., translational adjustment along x, y and z axes and rotational adjustment about pitch, yaw and roll axes).

Figures 17, 18:
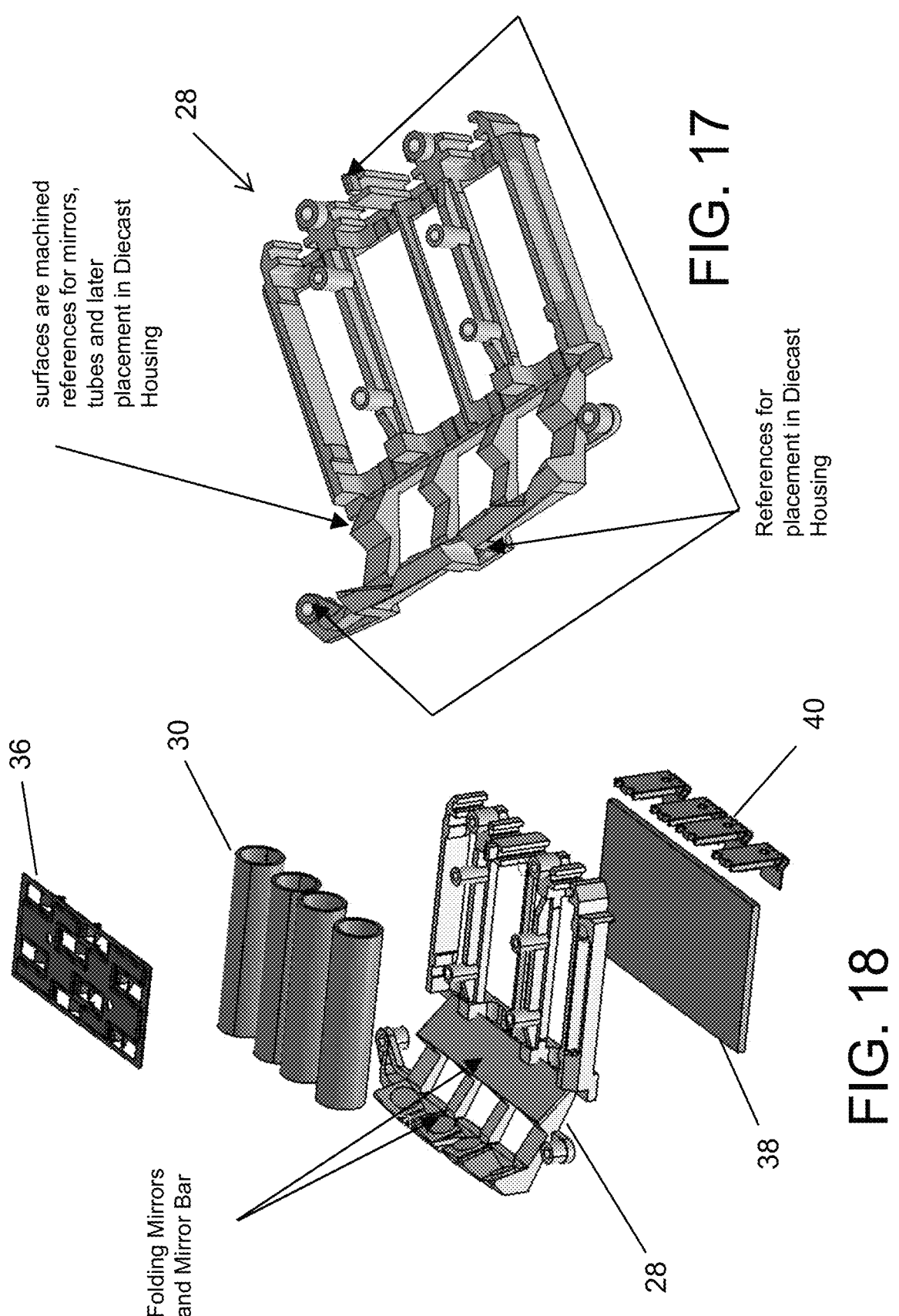
FIG. 17 is a perspective view of the diecast mirror holder.
FIGS. 18-22 are perspective views showing the assembly process of the sensor unit of the sensor module.

As shown in FIG. 17, the diecast mirror holder 28 has machined surfaces to provide machined references for the mirrors, tubes and later placement in the diecast housing of the laser unit. The folding mirrors and mirror bar are disposed at respective reference surfaces of the mirror holder (FIG. 18), and may be adhesively attached thereat. The mirror holder is accurately produced with surfaces for contact to the mirror surface and surfaces for contact to reference features in the diecast housing.

Figure 19:
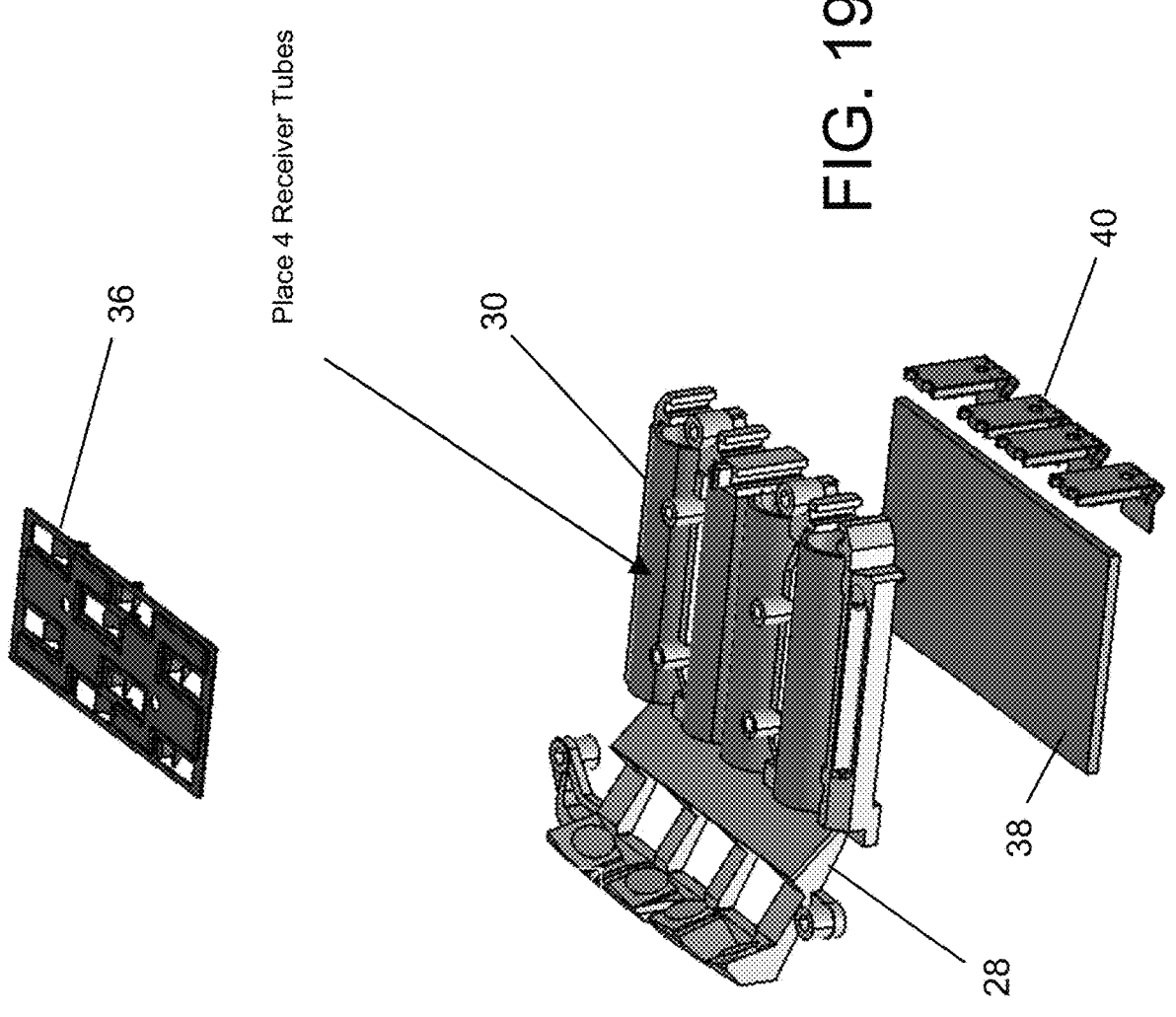
Figure 20:
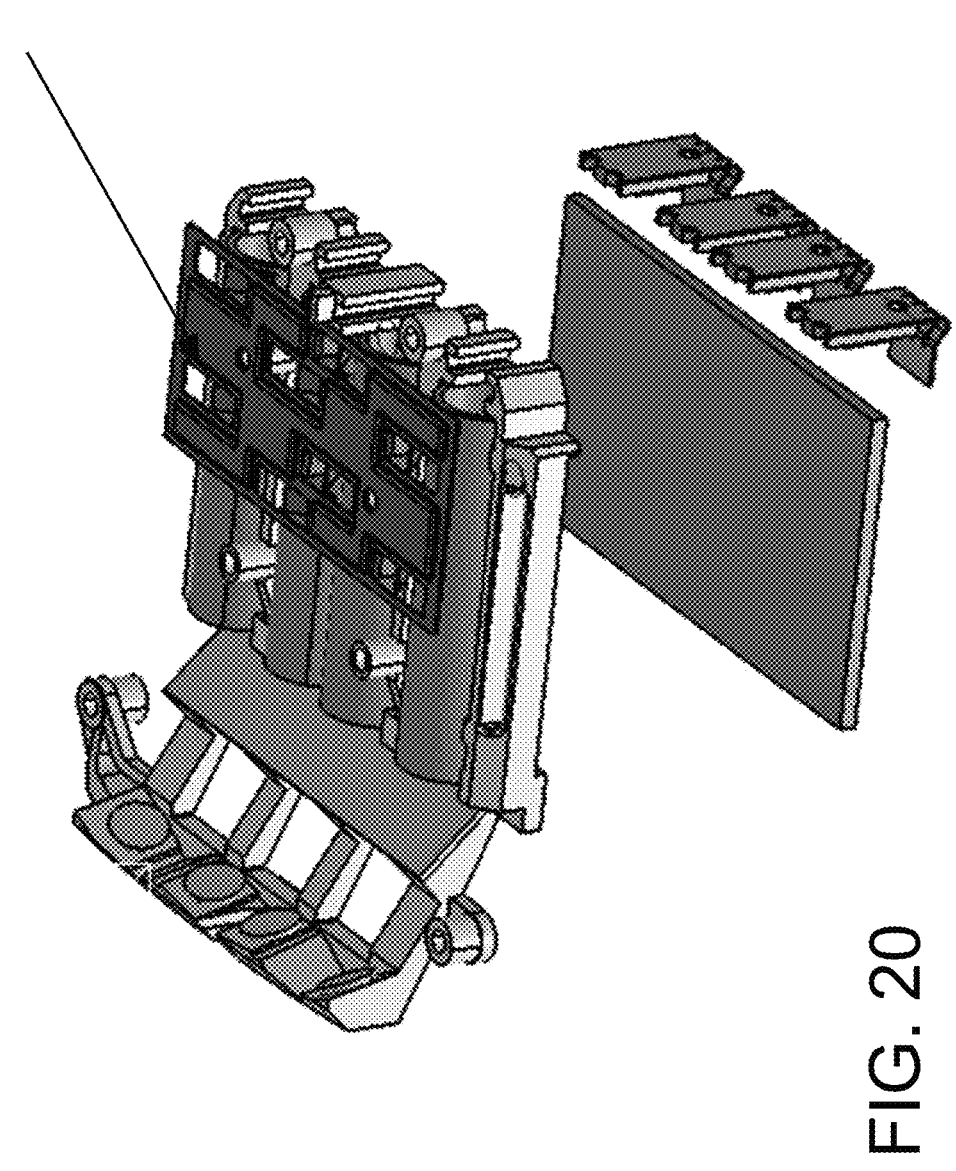
Figure 21:
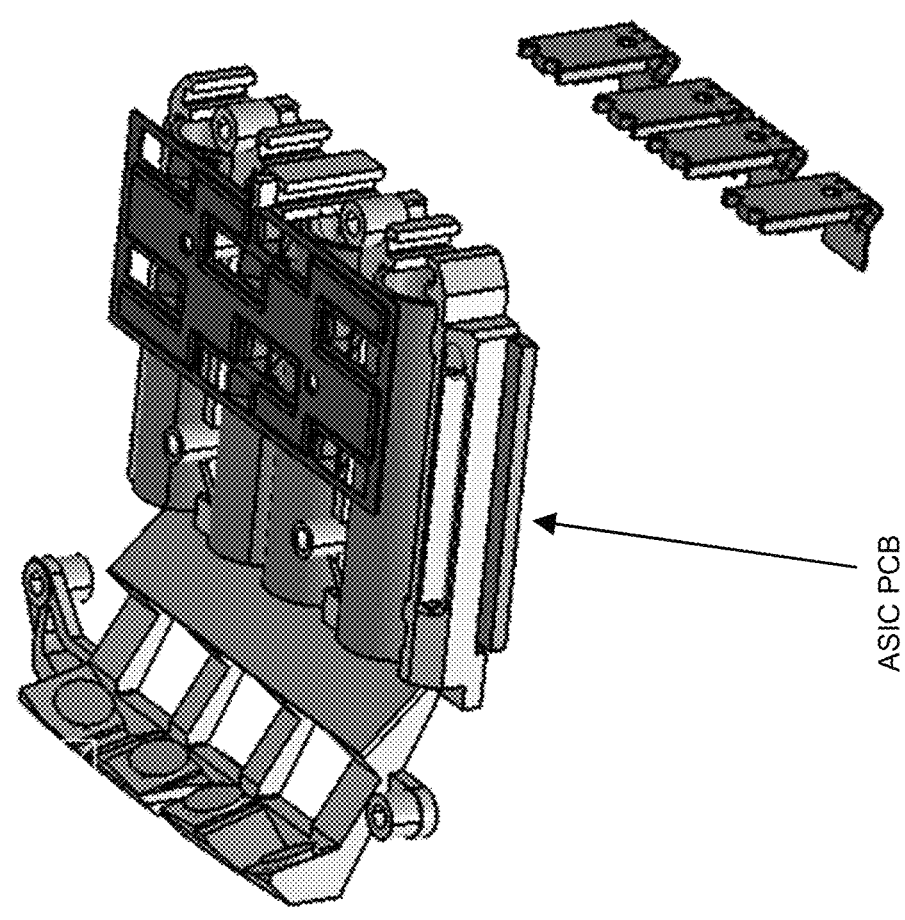
Figures 22, 22A:
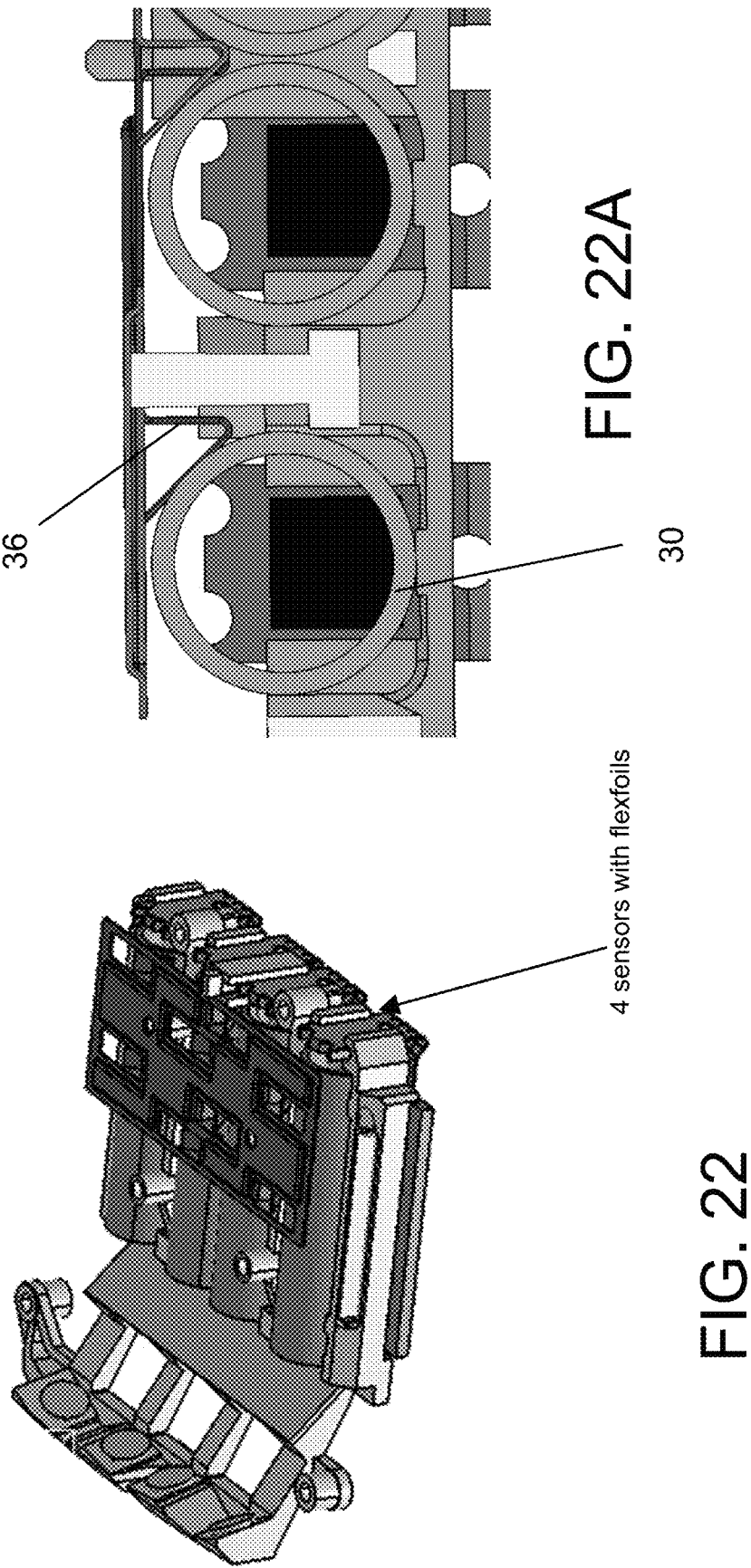
FIG. 22A is an end view showing the receiver tubes urged against two surfaces via a spring element.
Figure 23:
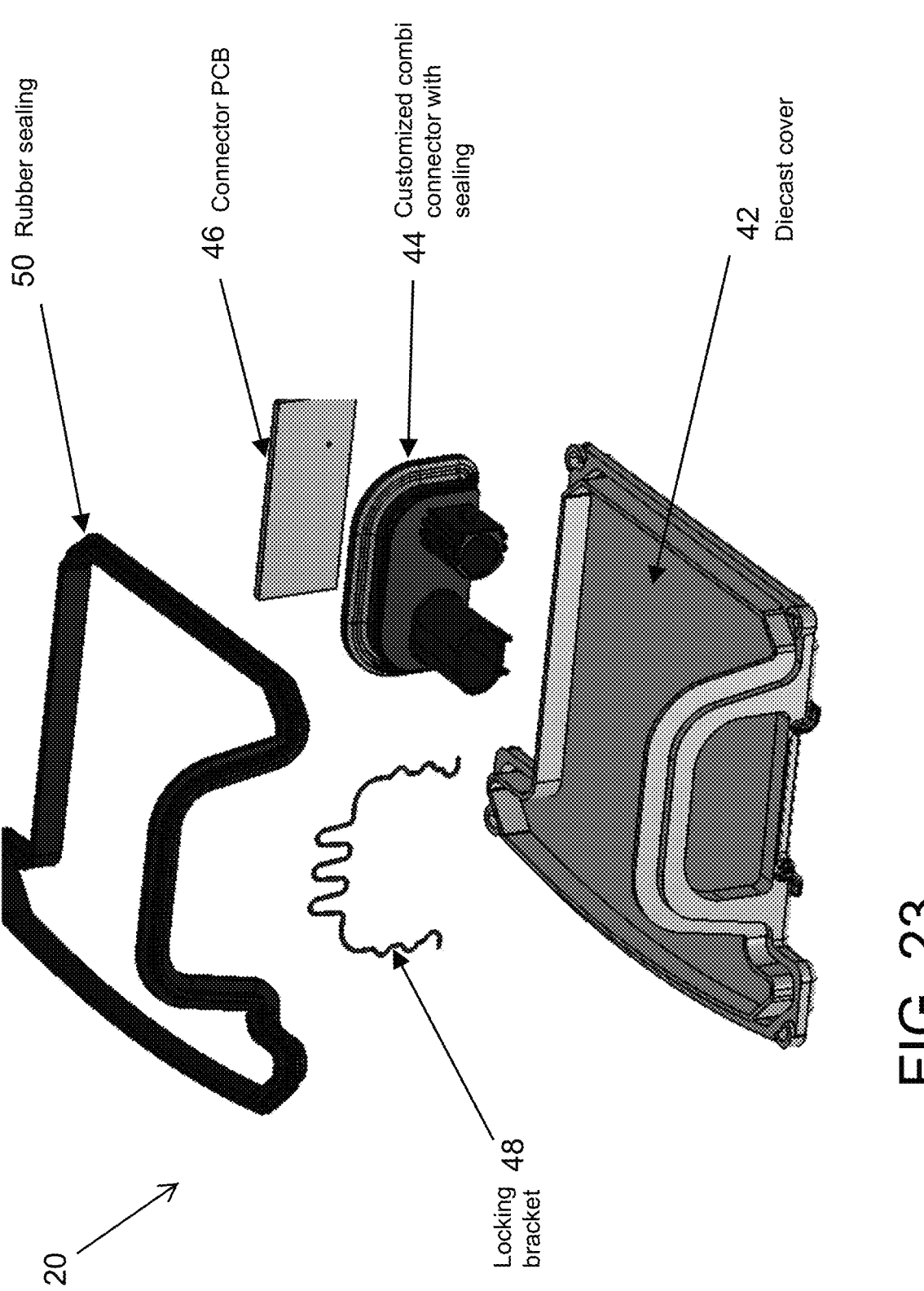
FIG. 23 is an exploded perspective view of the cover of the sensor module.
Figure 24:
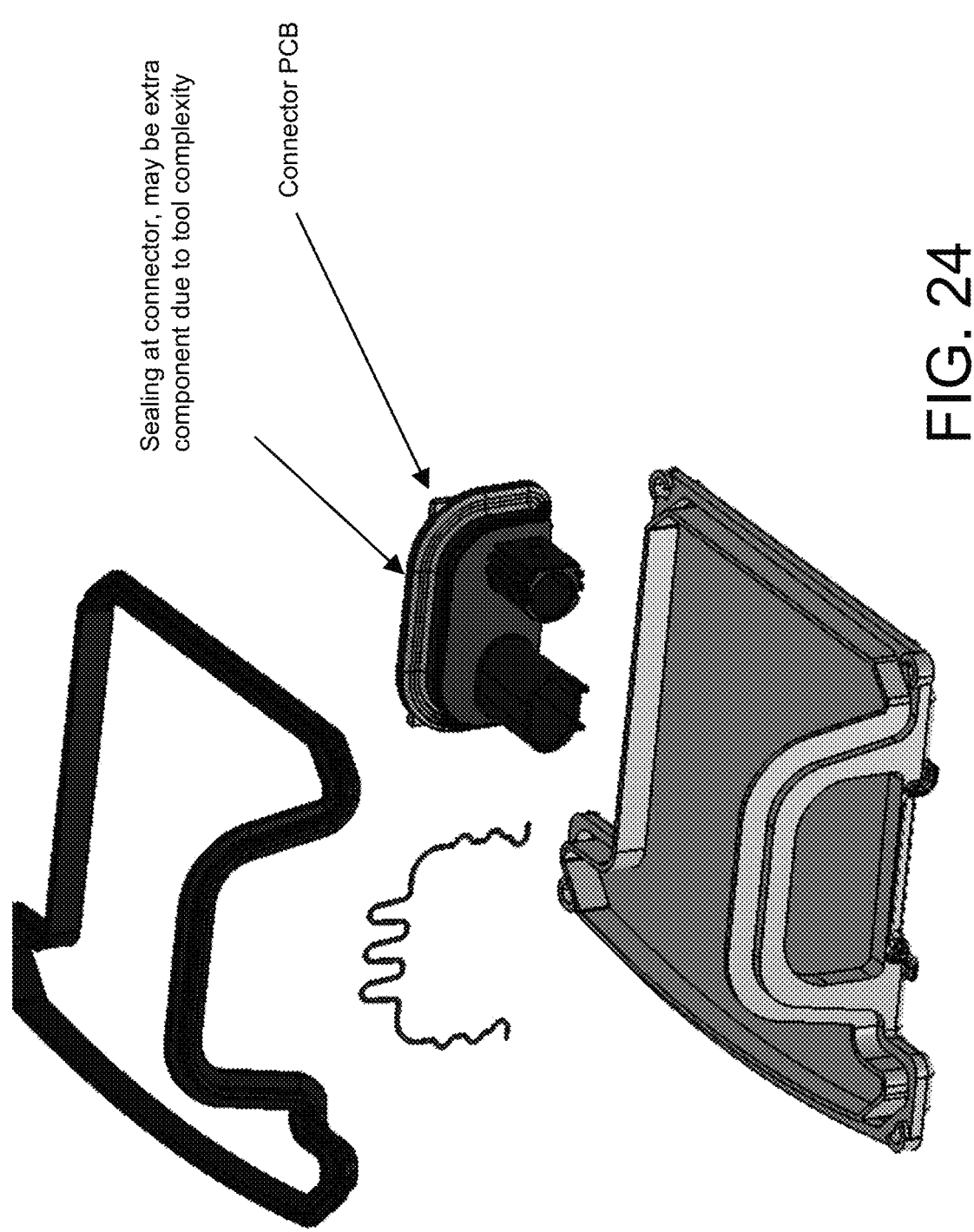
FIGS. 24-27 are perspective views showing the assembly process of the cover of the sensor module.
Figure 25:
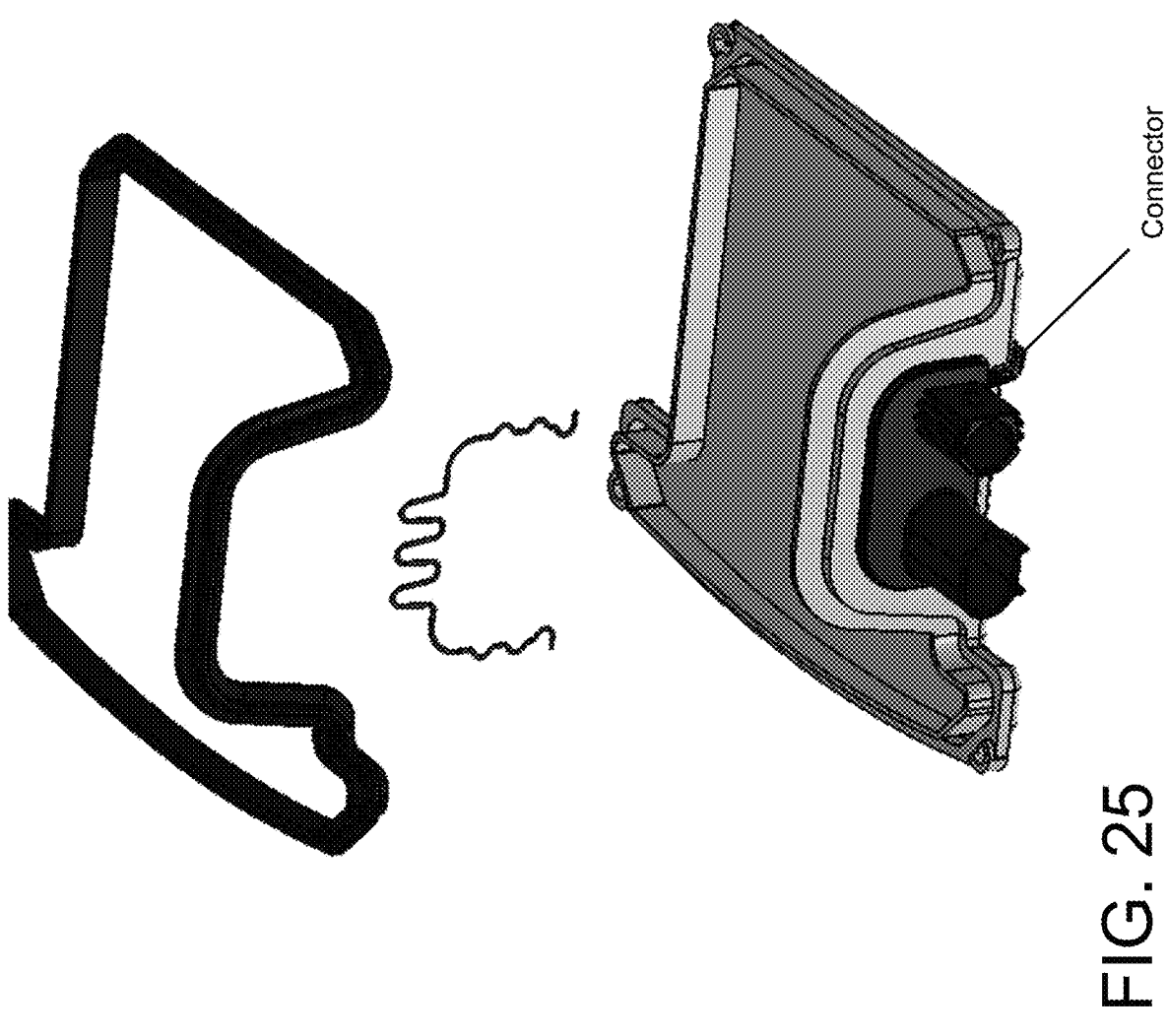

The receiver tubes are placed in the receiving structure of the mirror holder (FIG. 19). No alignment or adhesive is needed. The spring element 36 is disposed over the tubes 30 (FIG. 20) to hold them in place at the holder 28. As shown in FIG. 22A, the spring presses each receiver tube against two surfaces to position the tubes at the mirror holder. The spring may be affixed to the mirror holder using two or more fasteners or screws. The ASIC PCB is attached at the underside of the mirror holder (FIG. 21), such as via fasteners, such as via, for example, four screws. The sensors are then attached at the holder and PCB and aligned with the tubes (FIG. 22). The sensors stick in four cavities inside the mirror holder with gaps to each side. Alignment with 4-fold 3-finger gripper achieves six degrees of freedom adjustability of the sensors (e.g., translational adjustment along x, y and z axes and rotational adjustment about pitch, yaw and roll axes). The sensors are then glued in their aligned position.

Figure 26:
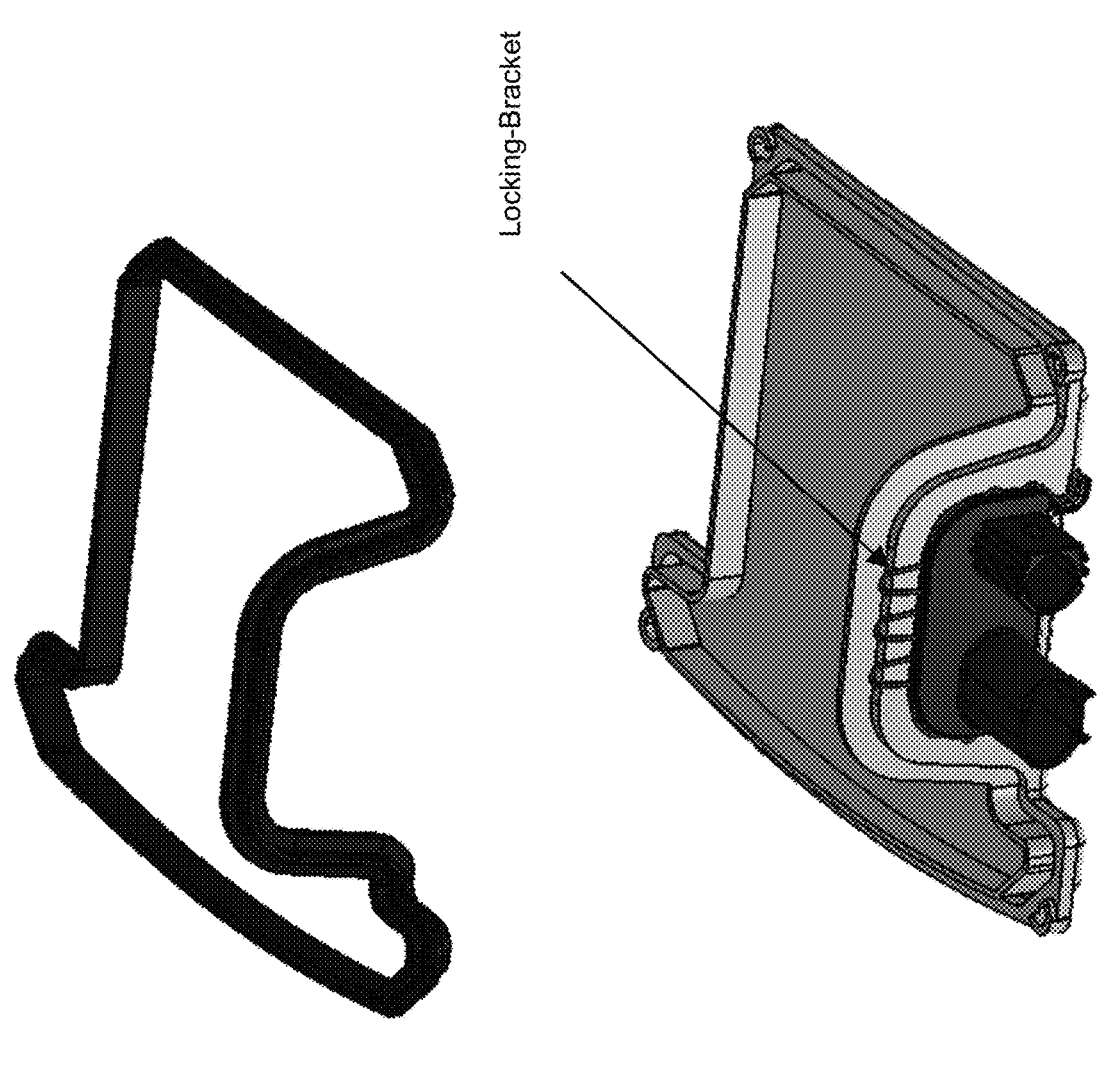
Figure 27:
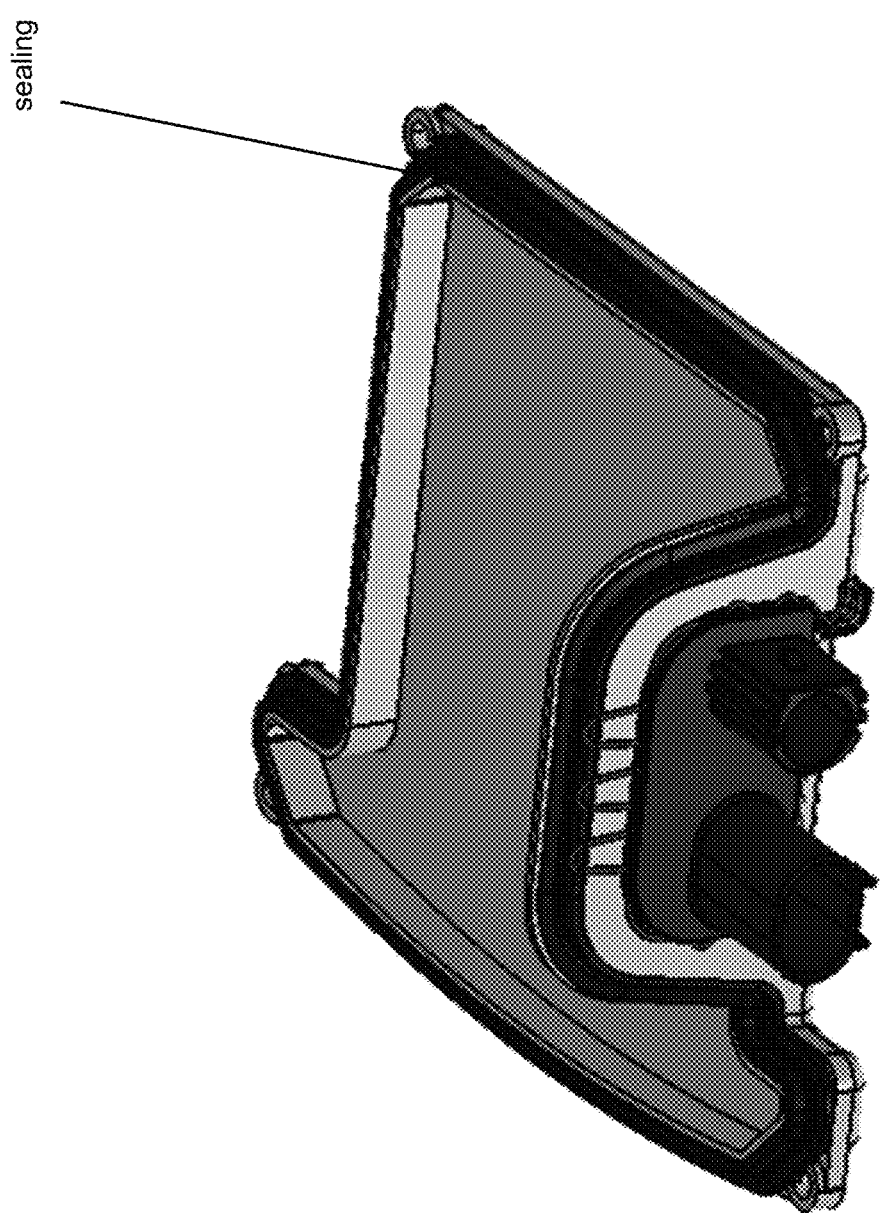

Referring now to FIGS. 23-27, the cover unit or cover assembly 20 includes a diecast metallic cover element 42, a combination connector with a sealing element 44, a connector PCB 46, a locking bracket 48 and a rubber sealing element 50. The sealing at the connector (such as a customized combined connector with sealing) may be an extra component or may be part of the connector. The connector PCB is attached at the connector and soldered thereat. The connector PCB and connector may comprise a pre-assembled subassembly including wiring, depending on the particular application. The connector is pushed through the opening in the diecast cover element with sufficient force to compress the sealing element and seal such that a portion of the connector body protrudes from the cover element for the locking bracket to engage. The connector is pressed into position (FIG. 25) and held in that position, and then the locking bracket is pressed or slid into the gap or groove at the connector until its resting position is reached (FIG. 26). When the cover element is attached at the laser unit and sensor unit assembly (discussed below), a rib on the diecast housing limits disengagement of the locking bracket from the connector (see FIG. 31). The sealing element is then disposed about the periphery of the cover element (FIG. 27). The sealing may comprise rubber or thermoplastic elastomer (TPE)/thermoplastic polyurethane (TPU), and may be pressed into a channel or the like (or an edge of the cover may be pressed into a channel or groove of the sealing element) around the gap at the cover element. Optionally, the cover may use a liquid sealing bead or the like.

Figure 28:
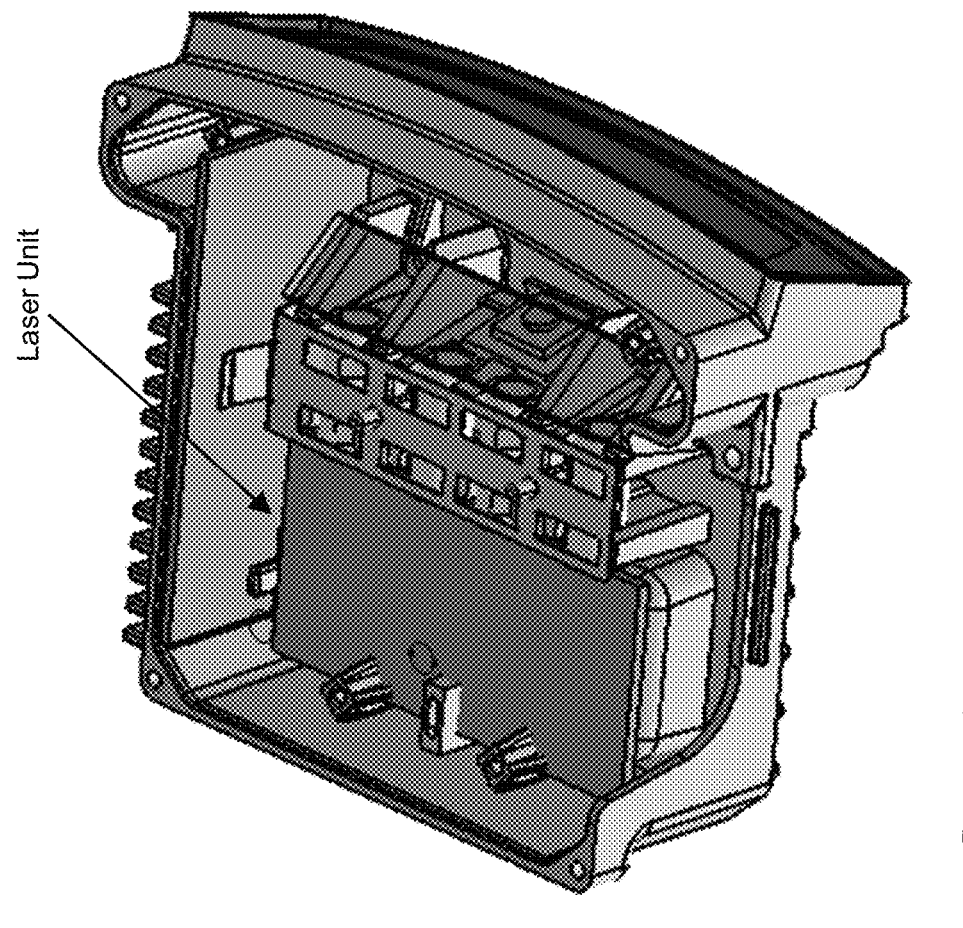
FIG. 28 is an underside perspective view of the laser unit of the sensor module (similar to FIG. 14)
Figure 29:
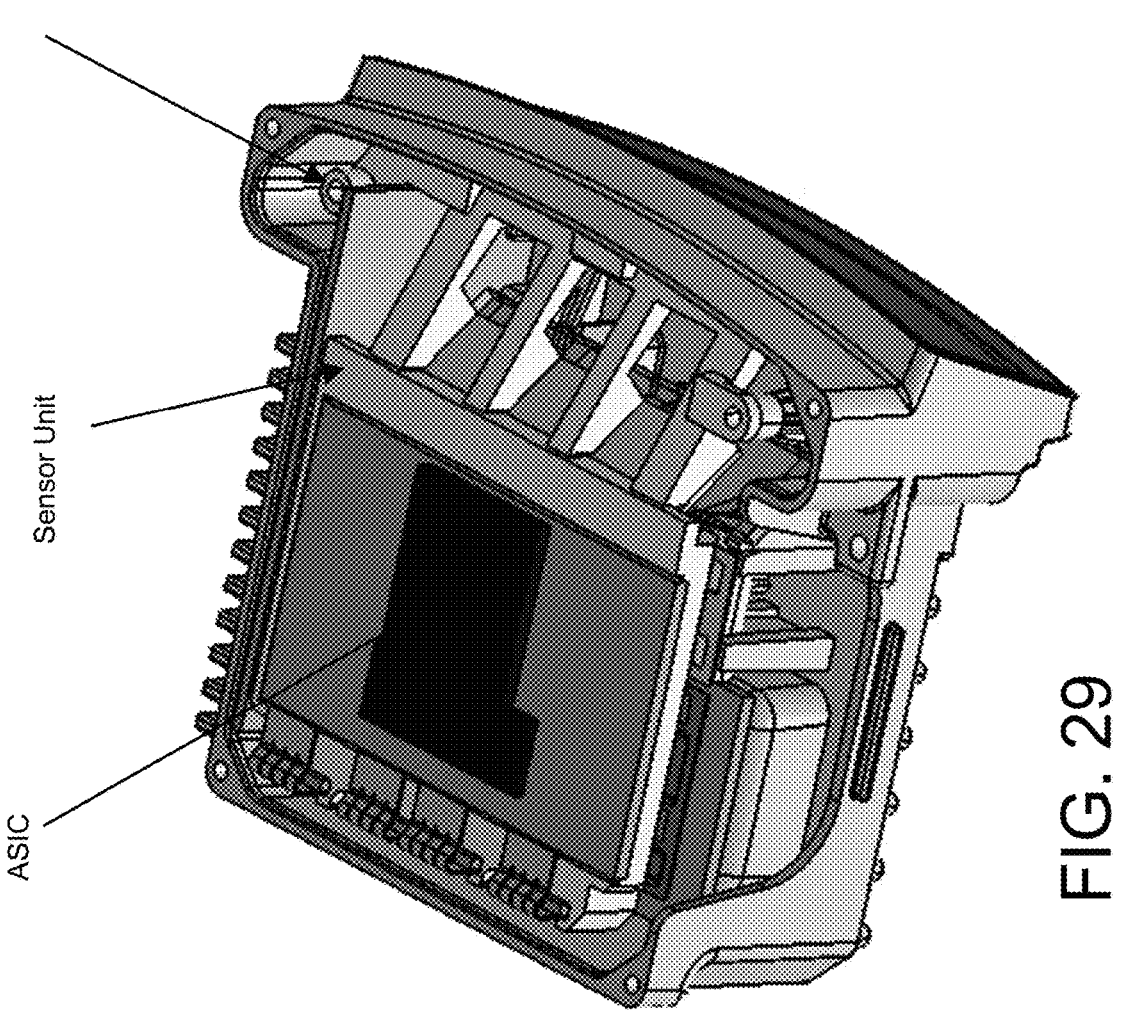
FIG. 29 is a perspective view of the sensor unit combined with and attached at the laser unit of the sensor module.
Figure 31:
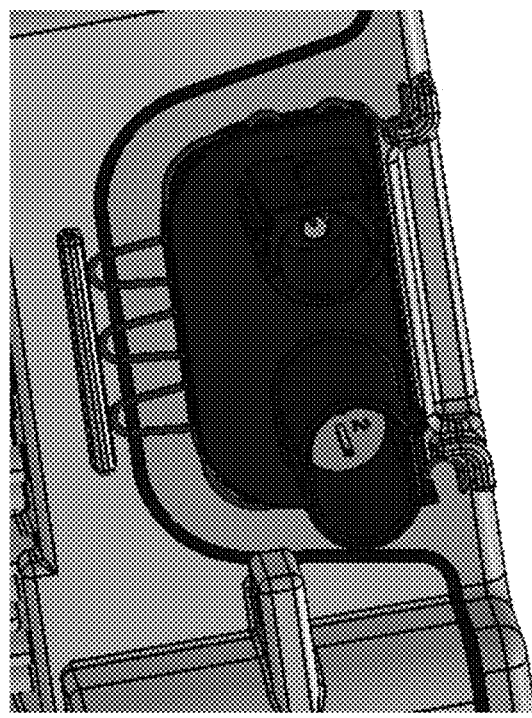
FIG. 31 is a perspective view showing the locking feature of the connector at the cover and sensor module.
Figure 30:
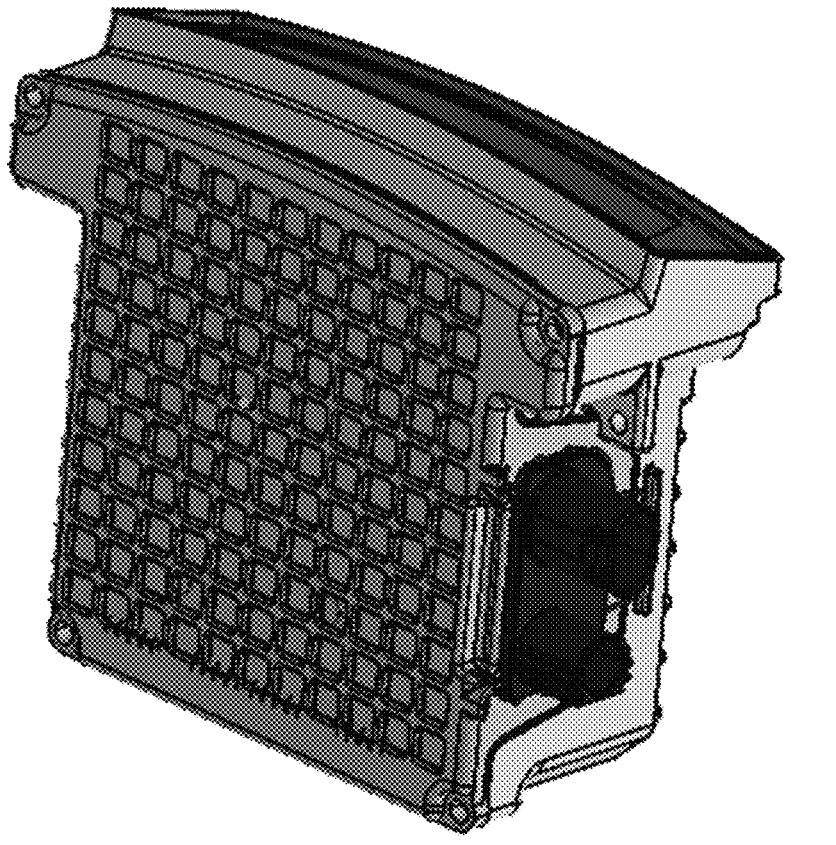
FIG. 30 is an underside perspective view of the sensor module.

The final assembly of the sensor module is made by attaching or combining the sensor unit and the laser unit (FIGS. 28 and 29). The sensor unit may be affixed at the diecast housing via fasteners that attach the mirror holder at the housing, such as at machined reference locations. For example, the sensor unit may be attached via a plurality of fasteners, such as via four screws or the like. A thermal paste may be applied at the ASIC surface. The cover assembly is then attached at the housing (FIG. 30) and attached thereat via one or more fasteners, such as, for example, via four screws or the like. When the cover is attached, the connector protrudes from a side of the housing and the connector PCB is electrically connected to circuitry of the PCBs of the sensor unit and laser unit. As shown in FIG. 31, the connector locking bracket engages a rib or protrusion at the housing to limit retraction of the locking bracket and thus to retain the connector at and relative to the cover element and at and relative to the housing. The connector is configured to electrically connect to a vehicle wire harness when the sensor module is disposed at a vehicle.

Thus, the sensor module provides a two-part design with mutual referencing (for the laser unit/receiver unit). The sensor module also provides an enhanced way of fixing the eight tubes (four laser tubes and four receiver tubes) with tension springs, which push the tubes against their respective reference surfaces. As discussed above, a tension spring urges the laser tubes against reference surfaces of the diecast housing, while another tension spring urges the receiver tubes against reference surfaces of the diecast mirror holder. The sensor module also uses a tension spring (optionally, the same spring that urges the laser tubes toward the reference surfaces of the housing) to additionally press a printed circuit board or PCB (such as a power PCB) against a side wall of the housing for thermocouple coupling (where the side wall of the housing may comprise a plurality of heat sinks or fins or the like to enhance cooling of the power PCB). The sensors are adjusted and held at respective individual nests of the mirror holder via slotted foils, which allows for sensor module adjustment in six degrees of freedom (e.g., translational adjustment along x, y and z axes and rotational adjustment about pitch, yaw and roll axes) while reducing the mechanical stresses in the foil.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular lidar sensor module, the vehicular lidar sensor module comprising:
   a laser unit, the laser unit comprising a housing, a laser printed circuit board, laser collimators and a first tension spring, wherein the first tension spring urges the laser collimators against respective reference surfaces of the housing;
   wherein laser emitters of the laser printed circuit board are located at an end of respective laser collimators, and wherein the laser collimators collimate light emitted by the respective laser emitters so that collimated laser light is emitted from an end of the laser collimators opposite the end at which the laser emitters are located;
   a sensor unit, the sensor unit comprising a holder, receiver tubes and a second tension spring, wherein the second tension spring urges the receiver tubes against respective reference surfaces of the holder;
   wherein the holder of the sensor unit is attached at the housing of the laser unit, and wherein, with the holder attached at the housing, the receiver tubes are disposed along and adjacent to the laser collimators;
   a cover unit attached at the housing of the laser unit;
   wherein the sensor unit comprises sensors disposed at an end of respective receiver tubes, and wherein the sensors are attached at the holder via respective flexible attaching elements that allow for multiple-degrees of freedom of adjustment of the sensors relative to the receiver tubes; and
   wherein, with the flexible attaching elements attached at the holder, the sensors are aligned relative to the respective laser collimators via the respective flexible attaching elements and are fixed in their aligned positions.

2. The vehicular lidar sensor module of claim 1, wherein the sensors are retained at respective nests of the holder.

3. The vehicular lidar sensor module of claim 1, wherein the sensor unit comprises mirror elements located at respective reference locations of the holder.

4. The vehicular lidar sensor module of claim 1, wherein the cover unit comprises a cover element and an electrical connector configured to electrically connect the vehicular lidar sensor module to a vehicle wire harness when the vehicular lidar sensor module is disposed at a vehicle equipped with the vehicular lidar sensor module.

5. The vehicular lidar sensor module of claim 4, wherein the electrical connector is retained at the cover element via a locking bracket.

6. The vehicular lidar sensor module of claim 5, wherein, with the cover element attached at the housing, the locking bracket engages a portion of the housing to limit or preclude detachment of the locking bracket.

7. The vehicular lidar sensor module of claim 1, wherein, with the vehicular lidar sensor module is disposed at a vehicle equipped with the vehicular lidar sensor module, light emitted by the laser collimators is reflected off of one or more objects exterior of the vehicle and received by the receiver tubes of the sensor unit and sensed by the sensors of the sensor unit.

8. The vehicular lidar sensor module of claim 7, wherein an electronic control unit of the vehicle detects presence of the one or more objects exterior of the vehicle via processing of outputs of the sensors of the sensor unit.

9. The vehicular lidar sensor module of claim 1, wherein the holder comprises a diecast holder.

10. The vehicular lidar sensor module of claim 1, wherein the housing comprises a diecast housing.

11. The vehicular lidar sensor module of claim 1, wherein a thermally conductive paste is disposed between and in contact with the laser printed circuit board and the housing.

12. The vehicular lidar sensor module of claim 1, further comprising a power printed circuit board.

13. The vehicular lidar sensor module of claim 12, wherein the first tension spring of the laser unit urges the power printed circuit board against the housing.

14. The vehicular lidar sensor module of claim 12, wherein a thermally conductive paste is disposed between and in contact with the power printed circuit board and the housing.

15. The vehicular lidar sensor module of claim 1, wherein the housing includes a plurality of heat sink elements to enhance heat dissipation.

16. The vehicular lidar sensor module of claim 1, wherein the first tension spring is disposed over the laser collimators and fixes the laser collimators and a power printed circuit board relative to the housing.

17. The vehicular lidar sensor module of claim 1, wherein attachment of the sensors at the holder via the respective flexible attaching elements allows for six-degrees of freedom of adjustment of the sensors relative to the receiver tubes.

18. A vehicular lidar sensor module, the vehicular lidar sensor module comprising:

a laser unit, the laser unit comprising a housing, a laser printed circuit board, a power circuit board, laser collimators and a first tension spring, wherein the first tension spring urges the laser collimators against respective reference surfaces of the housing, and wherein the first tension spring urges the power printed circuit board against the housing;

wherein laser emitters of the laser printed circuit board are located at an end of respective laser collimators, and wherein the laser collimators collimate light emitted by the respective laser emitters so that collimated laser light is emitted from an end of the laser collimators opposite the end at which the laser emitters are located;

a sensor unit, the sensor unit comprising a holder, receiver tubes and a second tension spring, wherein the second tension spring urges the receiver tubes against respective reference surfaces of the holder;

wherein the holder of the sensor unit is attached at the housing of the laser unit, and wherein, with the holder attached at the housing, the receiver tubes are disposed along and adjacent to the laser collimators;

a cover unit attached at the housing of the laser unit;

wherein the sensor unit comprises sensors disposed at an end of respective receiver tubes, and wherein the sensors are attached at the holder via respective flexible attaching elements that allow for multiple-degrees of freedom of adjustment of the sensors relative to the receiver tubes;

wherein, with the flexible attaching elements attached at the holder, the sensors are aligned relative to the respective laser collimators via the respective flexible attaching elements and are fixed in their aligned positions; and wherein the cover unit comprises a cover element and an electrical connector configured to electrically connect the vehicular lidar sensor module to a vehicle wire harness when the vehicular lidar sensor module is disposed at a vehicle equipped with the vehicular lidar sensor module.

19. The vehicular lidar sensor module of claim 18, wherein the electrical connector is retained at the cover element via a locking bracket.

20. The vehicular lidar sensor module of claim 19, wherein, with the cover element attached at the housing, the locking bracket engages a portion of the housing to limit or preclude detachment of the locking bracket.

21. The vehicular lidar sensor module of claim 18, wherein, with the vehicular lidar sensor module is disposed at the vehicle, light emitted by the laser collimators is reflected off of one or more objects exterior of the vehicle and received by the receiver tubes of the sensor unit and sensed by the sensors of the sensor unit, and wherein an electronic control unit of the vehicle detects presence of the one or more objects exterior of the vehicle via processing of outputs of the sensors of the sensor unit.

22. The vehicular lidar sensor module of claim 18, wherein the holder comprises a diecast holder, and wherein the housing comprises a diecast housing.

23. The vehicular lidar sensor module of claim 18, wherein a thermally conductive paste is disposed between and in contact with the laser printed circuit board and the housing.

24. The vehicular lidar sensor module of claim 18, wherein a thermally conductive paste is disposed between and in contact with the power printed circuit board and the housing.

25. The vehicular lidar sensor module of claim 18, wherein the housing includes a plurality of heat sink elements to enhance heat dissipation.

26. The vehicular lidar sensor module of claim 18, wherein attachment of the sensors at the holder via the respective flexible attaching elements allows for six-degrees of freedom of adjustment of the sensors relative to the receiver tubes.

27. A vehicular lidar sensor module, the vehicular lidar sensor module comprising:

a laser unit, the laser unit comprising a housing, a laser printed circuit board, laser collimators and a first tension spring, wherein the first tension spring urges the laser collimators against respective reference surfaces of the housing;

wherein laser emitters of the laser printed circuit board are located at an end of respective laser collimators, and wherein the laser collimators collimate light emitted by the respective laser emitters so that collimated laser light is emitted from an end of the laser collimators opposite the end at which the laser emitters are located;

wherein the laser unit includes a beam splitter at the end of the laser collimators opposite the end at which the laser emitters are located;

a sensor unit, the sensor unit comprising a holder, receiver tubes and a second tension spring, wherein the second tension spring urges the receiver tubes against respective reference surfaces of the holder;

wherein the holder of the sensor unit is attached at the housing of the laser unit, and wherein, with the holder attached at the housing, the receiver tubes are disposed along and adjacent to the laser collimators;

a cover unit attached at the housing of the laser unit;

wherein the sensor unit comprises sensors disposed at an end of respective receiver tubes, and wherein the sensors are attached at the holder via respective flexible attaching elements that allow for multiple-degrees of freedom of adjustment of the sensors relative to the receiver tubes;

wherein, with the flexible attaching elements attached at the holder, the sensors are aligned relative to the respective laser collimators via the respective flexible attaching elements and are fixed in their aligned positions; and wherein the cover unit comprises a cover element and an electrical connector configured to electrically connect the vehicular lidar sensor module to a vehicle wire harness when the vehicular lidar sensor module is disposed at a vehicle equipped with the vehicular lidar sensor module.

28. The vehicular lidar sensor module of claim 27, wherein the electrical connector is retained at the cover element via a locking bracket.

29. The vehicular lidar sensor module of claim 28, wherein, with the cover element attached at the housing, the locking bracket engages a portion of the housing to limit or preclude detachment of the locking bracket.

30. The vehicular lidar sensor module of claim 27, wherein, with the vehicular lidar sensor module disposed at the vehicle, light emitted by the laser collimators is reflected off of one or more objects exterior of the vehicle and received by the receiver tubes of the sensor unit and sensed by the sensors of the sensor unit, and wherein an electronic control unit of the vehicle detects presence of the one or more objects exterior of the vehicle via processing of outputs of the sensors of the sensor unit.

31. The vehicular lidar sensor module of claim 27, wherein the holder comprises a diecast holder, and wherein the housing comprises a diecast housing.

32. The vehicular lidar sensor module of claim 27, wherein a thermally conductive paste is disposed between and in contact with the laser printed circuit board and the housing.

33. The vehicular lidar sensor module of claim 27, wherein the housing includes a plurality of heat sink elements to enhance heat dissipation.

34. The vehicular lidar sensor module of claim 27, wherein attachment of the sensors at the holder via the respective flexible attaching elements allows for six-degrees of freedom of adjustment of the sensors relative to the receiver tubes.

* * * * *